US011922959B2

(12) United States Patent
Ragot et al.

(10) Patent No.: US 11,922,959 B2
(45) Date of Patent: Mar. 5, 2024

(54) SPATIALIZED AUDIO CODING WITH INTERPOLATION AND QUANTIZATION OF ROTATIONS

(71) Applicant: ORANGE, Issy-les-Moulineaux (FR)

(72) Inventors: Stéphane Ragot, Chatillon (FR); Pierre Mahe, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 323 days.

(21) Appl. No.: 17/436,390

(22) PCT Filed: Feb. 10, 2020

(86) PCT No.: PCT/EP2020/053264

§ 371 (c)(1),
(2) Date: Sep. 3, 2021

(87) PCT Pub. No.: WO2020/177981

PCT Pub. Date: Sep. 10, 2020

(65) Prior Publication Data

US 2022/0148607 A1 May 12, 2022

(30) Foreign Application Priority Data

Mar. 5, 2019 (EP) .................................... 19305254

(51) Int. Cl.
*G10L 19/032* (2013.01)
*G10L 19/002* (2013.01)
(Continued)

(52) U.S. Cl.
CPC .......... *G10L 19/032* (2013.01); *G10L 19/002* (2013.01); *G10L 19/008* (2013.01); *G10L 19/06* (2013.01)

(58) Field of Classification Search
CPC ...... G10L 19/032; G10L 19/002; G10L 19/06
See application file for complete search history.

(56) References Cited

U.S. PATENT DOCUMENTS

2014/0358565 A1* 12/2014 Peters ....................... H04S 7/30 704/500
2016/0155448 A1* 6/2016 Purnhagen ............ G10L 19/008 704/204

OTHER PUBLICATIONS

English translation of the Written Opinion of the International Searching Authority dated Apr. 17, 2020 for corresponding International Application No. PCT/EP2020/053264, filed Feb. 10, 2020.
(Continued)

*Primary Examiner* — Ibrahim Siddo
(74) *Attorney, Agent, or Firm* — David D. Brush; Westman, Champlin & Koehler, P.A.

(57) ABSTRACT

A method and device for compressing audio signals forming, over time, a succession of sample frames, in each of N channels of an ambisonic representation of order higher than 0. The method includes: forming, based on the channels and for a current frame, a matrix of inter-channel covariance, and searching for eigenvectors of the covariance matrix with a view to obtaining a matrix of eigenvectors; testing the matrix of eigenvectors to verify that it represents a rotation in an N-dimensional space, and if not, correcting the matrix of eigenvectors until a rotation matrix is obtained, for the current frame; and applying the rotation matrix to the signals of the N channels before separate-channel encoding of the signals.

18 Claims, 6 Drawing Sheets

(51) Int. Cl.
*G10L 19/008* (2013.01)
*G10L 19/06* (2013.01)

(56) References Cited

OTHER PUBLICATIONS

International Search Report dated Apr. 7, 2020 for corresponding International Application No. PCT/EP2020/053264, Feb. 10, 2020.

Written Opinion of the International Searching Authority dated Apr. 7, 2020 for corresponding International Application No. PCT/EP2020/053264, filed Feb. 10, 2020.

Roumen Kountchev et al, "New method for adaptive karhunen-loeve color transform", Telecommunication in Modern Satellite, Cable, and Broadcasting Services, 2009. Telsiks '09. 9th International Conference on, IEEE, Piscataway, NJ, USA, Oct. 7, 2009 (Oct. 7, 2009), p. 209-216, XP031573422.

* cited by examiner

SPATIALIZED AUDIO CODING WITH INTERPOLATION AND QUANTIZATION OF ROTATIONS

CROSS-REFERENCE TO RELATED APPLICATIONS

This application is a Section 371 National Stage Application of International Application No. PCT/EP2020/053264, filed Feb. 10, 2020, the content of which is incorporated herein by reference in its entirety, and published as WO 2020/177981 on Sep. 10, 2020, not in English.

FIELD OF THE DISCLOSURE

This invention relates to the encoding/decoding of spatialized audio data, particularly in an ambiophonic context (hereinafter also referred to as "ambisonic").

BACKGROUND OF THE DISCLOSURE

The encoders/decoders (hereinafter called "codecs") currently used in mobile telephony are mono (a single signal channel for reproduction on a single loudspeaker). The 3GPP EVS codec (for "Enhanced Voice Services") makes it possible to offer "Super-HD" quality (also called "High Definition+" voice or HD+) with a super-wideband (SWB) audio band for signals sampled at 32 or 48 kHz or full-band (FB) for signals sampled at 48 kHz; the audio bandwidth is from 14.4 to 16 kHz in SWB mode (9.6 to 128 kbps) and 20 kHz in FB mode (16.4 to 128 kbps).

The next evolution in quality in conversational services offered by operators should consist of immersive services, using terminals such as smartphones for example equipped with several microphones or devices for spatialized audio conferencing or telepresence type videoconferencing, or even tools for sharing "live" content, with spatialized 3D audio rendering, much more immersive than a simple 2D stereo reproduction. With the increasingly widespread practice of listening to content on mobile phones with an audio headset and the appearance of advanced audio equipment (accessories such as a 3D microphone, voice assistants with acoustic antennas, virtual reality headsets, etc.) and specific tools (for example for the production of 360° video content), the capturing and rendering of spatialized sound scenes are now common enough to offer an immersive communication experience.

To this end, the future 3GPP standard "IVAS" (for "Immersive Voice And Audio Services") proposes extending the EVS codec to include immersion, by accepting, as input formats to the codec, at least the spatialized audio formats listed below (and their combinations):

- Stereo-type multichannel format ("channel-based"), 5.1, where each channel feeds a speaker (for example L and R in stereo, or L, R, Ls, Rs and C in 5.1)
- Object-based format where audio objects are described as an audio signal (generally mono) associated with metadata describing the attributes of this object (position in space, spatial width of the source, etc.), and
- Ambisonic format ("scene-based") which describes the sound field at a given point, generally captured by a spherical microphone or synthesized in the domain of spherical harmonics.

Hereinafter, we are typically interested in the coding of a sound in ambisonic format, as an exemplary embodiment (at least some aspects presented in connection with the invention below can also be applied to formats other than ambisonic).

Ambisonics is a method of recording ("encoding" in the acoustic sense) spatialized sound, and a reproduction system ("decoding" in the acoustic sense). An ambisonic microphone (first-order) comprises at least four capsules (typically of the cardioid or sub-cardioid type) arranged on a spherical grid, for example the vertices of a regular tetrahedron. The audio channels associated with these capsules are called "A-format". This format is converted into a "B-format", in which the sound field is divided into four components (spherical harmonics) denoted W, X, Y, Z, which correspond to four coincident virtual microphones. The W component corresponds to an omnidirectional capture of the sound field, while the X, Y, and Z components, more directional, are comparable to pressure gradients oriented in the three spatial dimensions. An ambisonic system is a flexible system in the sense that the recording and reproduction are separate and decoupled. It allows decoding (in the acoustic sense) in any speaker configuration (for example, binaural, type 5.1 surround-sound, or type 7.1.4 periphonic (with height). Of course, the ambisonic approach can be generalized to more than four channels in B-format and this generalized representation is called "HOA" (for "Higher-Order Ambisonics"). The fact that the sound is broken down into more spherical harmonics improves the spatial accuracy of the reproduction when rendering on loudspeakers.

An N-order ambisonic signal comprises $(N+1)^2$ components, and at first-order (if N=1), we find the four components of the original ambisonics which is commonly called FOA (for First-Order Ambisonics). There is also what is called a "planar" variant of ambisonics which breaks down the defined sound into a plane which is generally the horizontal plane. In this case, the number of channels is 2N+1 channels. The first-order ambisonics (4 channels: W, X, Y, Z) and the first-order planar ambisonics (3 channels: W, X, Y) are hereinafter indiscriminately referred to as "ambisonics" to facilitate reading, the processing presented being applicable independently of whether or not the type is planar. However, if in certain text it is necessary to make a distinction, the terms "first-order ambisonics" and "first-order planar ambisonics" are used. Note that it is possible to derive from the first-order B-format a stereo signal (2 channels) corresponding to coincident stereo captures of the types Blumlein Crossed Pair (X+Y and X−Y) or Mid-Side (combining W and X for the Mid and taking Y as the Side).

Hereinafter, a signal in B-format of predetermined order is called "ambisonic sound". In some variants, the ambisonic sound can be defined in another format such as A-format or channels pre-combined by fixed matrixing (keeping the number of channels or reducing it to a case of 3 or 2 channels), as will be seen below.

The signals to be processed by the encoder/decoder are presented as successions of blocks of sound samples called "frames" or "subframes" below.

In addition, hereinafter, the mathematical notations follow this convention:

Vector: u (lowercase, bold)

Matrix: A (uppercase, bold)

The simplest approach to encoding a stereo or ambisonic signal is to use a mono encoder and apply it in parallel to all the channels, possibly with a different bit allocation depending on the channels. This approach here is called "multi-mono" (although in practice we can generalize the approach to multi-stereo or the use of several parallel instances of a same core codec).

Such an embodiment is shown in FIG. 1. The input signal is divided into (mono) channels in block 100. These channels are individually encoded in blocks 120 to 122 according to a predetermined allocation. Their bit stream is multiplexed (block 130) and after transmission and/or storage it is demultiplexed (block 140) in order to apply decoding to each of the channels (blocks 150 to 152) which are recombined (block 160).

The associated quality varies according to the mono coding used, and it is generally satisfactory only at very high bitrate, for example with a bitrate of at least 48 kbps per mono channel for EVS coding. Thus for first-order we obtain a minimum bitrate of 4×48=192 kbps.

The solutions currently proposed for more sophisticated codecs, for ambisonic spatialization in particular, are unsatisfactory, particular in terms of complexity, delay, and efficient use of the bitrate, to ensure effective decorrelation between ambisonic channels.

For example, the MPEG-H codec for ambisonic sounds uses an overlap-add operation which adds delay and complexity, as well as linear interpolation on direction vectors which is suboptimal and introduces defects. A basic problem with this codec is that it implements a decomposition into predominant components and ambiance because the predominant components are meant to be perceptually distinct from the ambience, but this decomposition is not fully defined. The MPEG-H encoder suffers from the problem of non-correspondence between the directions of the main components from one frame to another: the order of the components (signals) can be swapped as can the associated directions. This is why the MPEG-H codec uses a technique of matching and overlap-add to solve this problem.

Furthermore, it would be possible to use frequency coding approaches (in the FFT or MDCT domain) rather than temporal coding as in the MPEG-H codec, but signal processing in the frequency domain (sub-bands) requires transmitting data to a decoder by sub-band, thus increasing the bitrate necessary for this transmission.

SUMMARY

The invention improves this situation.

To this end, it proposes a method of encoding for the compression of audio signals forming, over time, a succession of sample frames, in each of N channels in an ambisonic representation of order higher than 0, the method comprising:

- forming, based on the channels and for a current frame, a matrix of inter-channel covariance, and searching for the eigenvectors of said covariance matrix with a view to obtaining a matrix of eigenvectors,
- testing the matrix of eigenvectors to verify that it represents a rotation in an N-dimensional space, and if not, correcting the matrix of eigenvectors until a rotation matrix is obtained, for the current frame, and
- applying said rotation matrix to the signals of the N channels before separate-channel encoding of said signals.

The invention thus makes it possible to improve a decorrelation between the N channels that are subsequently to be encoded separately. This separate encoding is also referred to hereinafter as "multi-mono encoding".

In one embodiment, the method may further comprise:

- encoding parameters taken from the rotation matrix for the purposes of transmission via a network.

These parameters can typically be quaternion and/or rotation angle and/or Euler angle values as will be seen below, or else simply elements of this matrix for example.

In one embodiment, the method may further comprise:

- comparing the matrix of eigenvectors that is obtained for the current frame, to a rotation matrix obtained for a frame preceding the current frame, and
- permuting columns of the matrix of eigenvectors of the current frame to ensure consistency with the rotation matrix of the previous frame.

Such an embodiment makes it possible to maintain overall homogeneity and in particular to avoid audible clicks from one frame to another, during audio reproduction.

However, certain transformations implemented to obtain the eigenvectors from the covariance matrix (such as "PCA/KLT" seen below) are likely to reverse the direction of certain eigenvectors, and it is then advisable at the same time to verify axis consistency, then directional consistency on this axis, for each eigenvector of the matrix of the current frame. To this end, in one embodiment, as the aforementioned permutation of columns already makes it possible to ensure consistency of the axes of the vectors, the method further comprises:

- verifying, for each eigenvector of the current frame, a directional consistency with a column vector of corresponding position in the rotation matrix of the previous frame, and
- in the event of inconsistency, inverting the sign of the elements of this eigenvector in the matrix of eigenvectors of the current frame.

Typically, with a permutation between columns of the matrix of eigenvectors to invert the sign of a determinant of the matrix of eigenvectors and the determinant of a rotation matrix being equal to 1, we can estimate the determinant of the matrix of eigenvectors, and if it is equal to −1, we can then invert the signs of the elements of a chosen column of the matrix of eigenvectors so that the determinant is equal to 1, and thus form a rotation matrix.

In one embodiment, the method may further comprise:

- an estimation of the difference between the rotation matrix obtained for the current frame and a rotation matrix obtained for a frame preceding the current frame,
- based on the estimated difference, determining whether at least one interpolation is to be performed between the rotation matrix of the current frame and the rotation matrix of the previous frame.

Such an interpolation then makes it possible to smooth ("progressively average") the rotation matrices respectively applied to the previous frame and current frame and thus attenuate an audible click effect from one frame to another during playback.

In such an implementation:

- based on the estimated difference, a number of interpolations to be performed between the rotation matrix of the current frame and the rotation matrix of the previous frame is determined,
- the current frame is divided into a number of subframes corresponding to the number of interpolations to be performed, and
- at least this number of interpolations can be encoded with a view to transmission via the aforementioned network.

In one embodiment, the ambisonic representation is first-order and the number N of channels is four, and the rotation matrix of the current frame is represented by two quaternions.

In this embodiment and in the case of an interpolation, each interpolation for a current subframe is a spherical linear interpolation (or "SLERP"), conducted as a function of the interpolation of the subframe preceding the current subframe and based on the quaternions of the preceding subframe.

For example, the spherical linear interpolation of the current subframe can be carried out to obtain the quaternions of the current subframe, as follows:

$$Q_{L,interp}(\alpha) = Q_{L,t-1}\frac{\sin(1-\alpha)\Omega_L}{\sin\Omega_L} + Q_{L,t}\frac{\sin\alpha\Omega_L}{\sin\Omega_L}$$

$$Q_{R,interp}(\alpha) = Q_{R,t-1}\frac{\sin(1-\alpha)\Omega_R}{\sin\Omega_R} + Q_{R,t}\frac{\sin\alpha\Omega_R}{\sin\Omega_R}$$

where:

$Q_{L,t-1}$ is one of the quaternions of the previous subframe t−1,
$Q_{R,t-1}$ is the other quaternion of the previous subframe t−1,
$Q_{L,t}\hat{}$ is one of the quaternions of the current subframe t,
$Q_{R,t}\hat{}$ is the other quaternion of the current subframe t,
$\Omega_L$=Arccos $(Q_{L,t-1}\cdot Q_{L,t})$; $\Omega_R$=Arccos $(Q_{R,t-1}\cdot Q_{R,t})$
and a corresponds to an interpolation factor.

In one embodiment, the search for eigenvectors is carried out by principal component analysis (or "PCA") or by Karhunen-Loève transform (or "KLT"), in the time domain.

Of course, other embodiments can be considered (singular value decomposition or others).

In one embodiment, the method comprises a prior step of predicting the bit allocation budget per ambisonic channel, comprising:

- for each ambisonic channel, estimating the current acoustic energy in the channel,
- selecting, in a memory, a predetermined quality score, based on this ambisonic channel and on a current bitrate in the network,
- estimating a weighting to be applied for the bit allocation to this channel, by multiplying the selected score by the estimated energy.

This embodiment then makes it possible to manage an optimal allocation of bits to be assigned for each channel to be coded. It is advantageous in and of itself and could possibly be the object of separate protection.

The invention also relates to a method for decoding audio signals forming, over time, a succession of sample frames, in each of N channels in an ambisonic representation of order higher than 0, the method comprising:

- receiving, for a current frame, in addition to the signals of the N channels of this current frame, parameters of a rotation matrix,
- constructing an inverse rotation matrix from said parameters,
- applying said inverse rotation matrix to signals from the N channels received, before separate-channel decoding of said signals.

Such an embodiment also makes it possible to improve, in decoding, a decorrelation between the N channels.

The invention also relates to an encoding device comprising a processing circuit for implementing the encoding method presented above.

It also relates to a decoding device comprising a processing circuit for implementing the above decoding method.

It also relates to a computer program comprising instructions for implementing the above method, when these instructions are executed by a processor of a processing circuit.

It also relates to a non-transitory memory medium storing the instructions of such a computer program.

BRIEF DESCRIPTION OF THE DRAWINGS

Other features and advantages of the invention will be apparent from reading the exemplary embodiments presented in the detailed description below, and from examining the accompanying drawings in which.

DETAILED DESCRIPTION OF ILLUSTRATIVE EMBODIMENTS

Figure 1:
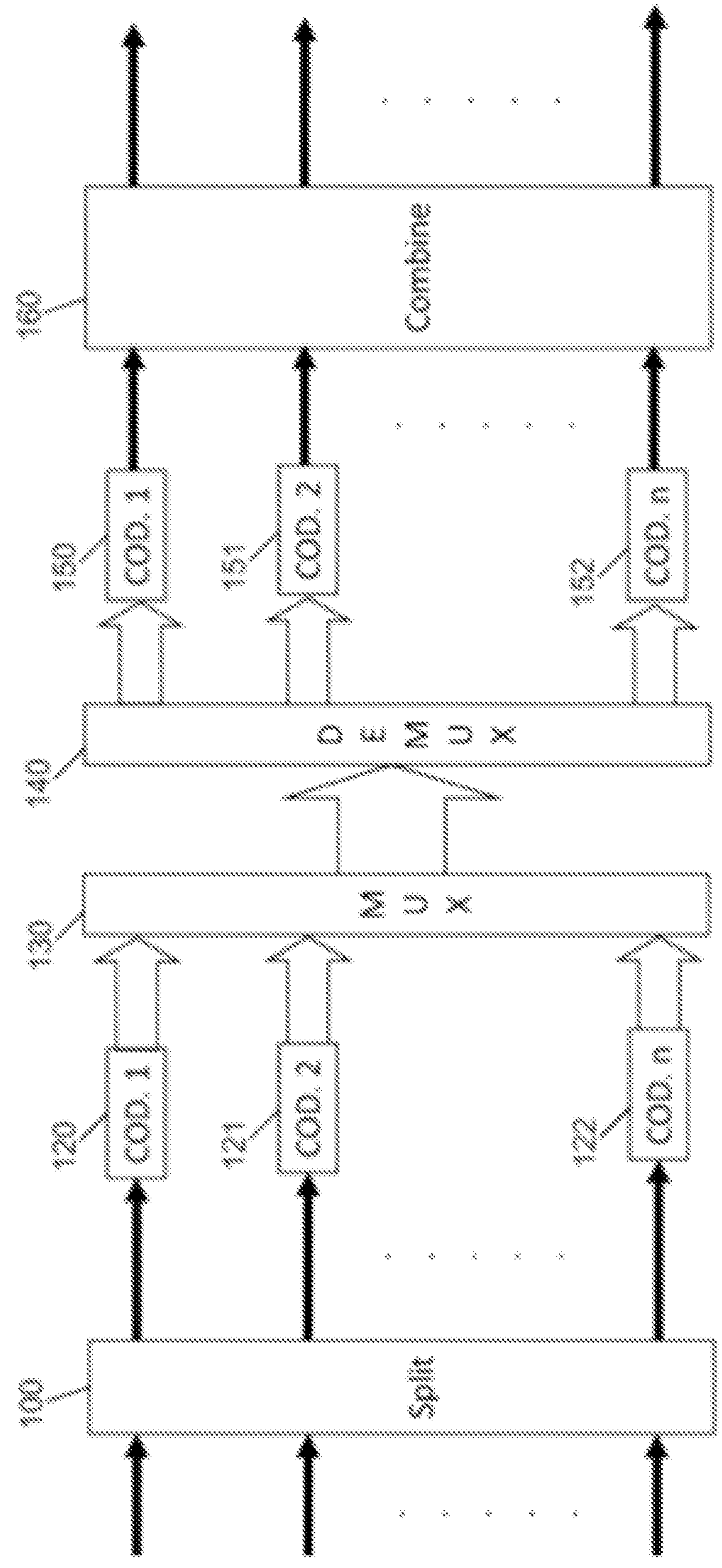
FIG. 1 illustrates multi-mono coding (prior art)

The invention aims to enable optimized encoding by:

- adaptive temporal matrixing (in particular with an adaptive transformation obtained by PCA/KLT ("PCA" designating a principal component analysis and "KLT" designating a Karhunen-Loève transform),
- preferably followed by multi-mono encoding.

Adaptive matrixing allows more efficient decomposition into channels than fixed matrixing. The matrixing according to the invention advantageously makes it possible to decorrelate the channels before multi-mono encoding, so that the coding noise introduced by encoding each of the channels distorts the spatial image as little as possible overall when the channels are recombined in order to reconstruct an ambisonic signal in decoding.

In addition, the invention makes it possible to ensure a gentle adaptation of the matrixing parameters in order to avoid "click" type artifacts at the edge of the frame or too rapid fluctuations in the spatial image, or even coding artifacts due to overly-strong variations (for example linked to untimely permutation of audio sources between channels) in the various individual channels resulting from the matrixing which are then encoded by different instances of a mono codec. A multi-mono encoding is presented below preferably with variable bit allocation between channels (after adaptive matrixing), but in some variants multiple instances of a stereo core codec or other can be used.

In order to facilitate understanding of the invention, certain explanatory concepts concerning n-dimensional rotations and PCA/KLT or SVD type decompositions ("SVD" denoting a singular value decomposition) are re-summarized below.

Rotations and "Quaternions"

The signals are represented by successive blocks of audio samples, these blocks being called "subframes" below.

The invention uses a representation of n-dimensional rotations with parameters suitable for quantization per frame and especially an efficient interpolation by subframe. The representations of rotations used in 2, 3, and 4 dimensions are defined below.

A rotation (around the origin) is a transformation of n-dimensional space that changes one vector to another vector, such that:

The amplitude of the vector is preserved

The cross product of vectors defining an orthonormal coordinate system before rotation is preserved after rotation (there is no reflection).

A matrix M of size n×n is a rotation matrix if and only if $M^T.M=I_n$ where $I_n$ designates the identity matrix of size n×n (i.e. M is a unitary matrix, $M^T$ designating the transpose of M) and its determinant is +1.

Several representations are used in the invention which are equivalent to the representation by rotation matrix:

In two dimensions (in a 2D plane) (n=2): We use the angle of rotation as the representation, as follows.

Given the angle of rotation θ we deduce the rotation matrix:

$$M_2(\theta)=\begin{pmatrix}\cos\theta & -\sin\theta\\ \sin\theta & \cos\theta\end{pmatrix}$$

Given a rotation matrix, we can calculate the angle θ by observing that the trace of the matrix is 2 cos θ. Note that it is also possible to estimate θ directly from a covariance matrix before applying a principal component decomposition (PCA) and eigenvalue decomposition (EVD) which are presented below.

The interpolation between two rotations of respective angles $\theta_1$ and $\theta_2$ can be done by linear interpolation between $\theta_1$ and $\theta_2$, taking into account the shortest-path constraint on the unit circle between these two angles.

In three-dimensional (3D) space (n=3): Euler angles and quaternions are used as the representation. In some variants, an axis-angle representation can also be used, which is not mentioned here.

A rotation matrix of size 3×3 can be broken down into a product of 3 elementary rotations of angle θ along the x, y, or z axes.

$$M_{3,x}(\theta)=\begin{pmatrix}1 & 0 & 0\\ 0 & \cos\theta & -\sin\theta\\ 0 & \sin\theta & \cos\theta\end{pmatrix}$$

$$M_{3,y}(\theta)=\begin{pmatrix}\cos\theta & 0 & \sin\theta\\ 0 & 1 & 0\\ -\sin\theta & 0 & \cos\theta\end{pmatrix}$$

$$M_{3,z}(\theta)=\begin{pmatrix}\cos\theta & -\sin\theta & 0\\ \sin\theta & \cos\theta & 0\\ 0 & 0 & 1\end{pmatrix}$$

Depending on the axis combinations, the angles are said to be Euler or Cardan angles.

However, another representation of 3D rotations is given by quaternions. Quaternions are a generalization of representations by complex numbers with four components in the form of a number q=a+bi+cj+dk where $i^2=j^2=k^2=ijk=-1$.

The real part a is called a scalar and the three imaginary parts (b, c, d) form a 3D vector. The norm of a quaternion is $|q|=\sqrt{a^2+b^2+c^2+d^2}$. Unit quaternions (of norm 1) represent rotations—however, this representation is not unique; thus, if q represents a rotation, −q represents the same rotation.

Given a unit quaternion q=a+bi+cj+dk (with $a^2+b^2+c^2+d^2=1$), the associated rotation matrix is:

$$M_{3,quat}(q)=\begin{pmatrix}a^2-b^2-c^2-d^2 & 2(bc-ad) & 2(ac+bd)\\ 2(ad+bc) & a^2-b^2+c^2-d^2 & 2(cd-ab)\\ 2(bd-ac) & 2(ab+cd) & a^2-b^2-c^2+d^2\end{pmatrix}$$

Euler angles do not allow correctly interpolating 3D rotations; to do so, we instead use quaternions or the axis-angle representation. The SLERP ("spherical linear interpolation") interpolation method consists of interpolating according to the formula:

$$slerp(q_1,q_2,\alpha)=\frac{\sin(1-\alpha)\Omega}{\sin\Omega}q_1+\frac{\sin\alpha\Omega}{\sin\Omega}q_2$$

where 0≤α≤1 is the interpolation factor for going from $q_1$ to $q_2$ and Ω is the angle between the two quaternions:

$$\Omega=\arccos(q_1.q_2)$$

where $q_1.q_2$ denotes the dot product between two quaternions (identical to the dot product between two 4-dimensional vectors).

This amounts to interpolating by following a large circle on a 4D sphere with a constant angular speed as a function of a. One must ensure that the shortest path is used for interpolating by changing the sign of one of the quaternions when $q_1.q_2<0$. Note that other methods for quaternion interpolation can be used (normalized linear interpolation or nlerp, splines, etc.).

Note that it is also possible to interpolate 3D rotations by means of the axis-angle representation; in this case, the angle is interpolated as in the 2D case, and the axis can be interpolated for example by the SLERP method (in 3D) while ensuring that the shortest path is taken on a 3D unit sphere and taking into account the fact that the representation given by the axis r and the angle θ is equivalent to that given by the axis of opposite direction −r and the angle 2π−θ.

In the $4^{th}$ dimension (n=4), a rotation can be parameterized by 6 angles (n(n−1)/2)) and we show that the multiplication of two matrices of size 4×4 called quaternion ($Q_1$) and antiquaternion ($Q^*_2$) associated with quaternions $q_1$=a+bi+cj+dk and $q_2$=w+xi+yj+zk gives a rotation matrix of size 4×4.

It is possible to find the associated quaternion pair ($q_1$, $q_2$) and associated quaternion and antiquaternion matrices such that:

$$Q_1=\begin{pmatrix}a & b & c & d\\ -b & a & -d & c\\ -c & d & a & -b\\ -d & -c & b & a\end{pmatrix}$$

and $$Q_2^*=\begin{pmatrix}w & -x & -y & -z\\ x & w & -z & y\\ y & z & w & -x\\ z & -y & x & w\end{pmatrix}$$

Their product gives a 4×4 size matrix:

$$M_{A,quat}(q_1,q_2)=Q_1Q\&_2$$

and it is possible to verify that this matrix satisfies the properties of a rotation matrix (unitary matrix and determinant equal to 1).

Conversely, given a 4×4 rotation matrix, this matrix can be factored into a product of matrices in the form $Q_1Q^*_2$, for example with the method known as "Cayley's factorization". This involves calculating an intermediate matrix called a "tetragonal transform" (or associated matrix) and deducing the quaternions from this with some indeterminacy on the sign of the two quaternions (which can be removed by an additional "shortest path" constraint mentioned further below).

Singular Value Decomposition (or "SVD")

Singular value decomposition (SVD) consists of factoring a real matrix A of size m×n in the form:

$$A=U\Sigma V^T$$

where U is a unitary matrix ($U^TU=I_m$) of size m×m, Σ is a rectangular diagonal matrix of size m×n with real and positive coefficients $\sigma_i \geq 0$ (i=1 . . . p where p=min (m, n)), V is a unitary matrix ($V^TV=I_n$) of size n×n, and $V^T$ is the transpose of V. The $\sigma_i$ coefficients in the diagonal of Σ are the singular values of matrix A. By convention, they are generally listed in decreasing order, and in this case the diagonal matrix Σ associated with A is unique.

The rank r of A is given by the number of non-zero coefficients $\sigma_i$. We can therefore rewrite the singular value decomposition as:

$$A = [U_r \tilde{U}_r] \begin{bmatrix} \Sigma_r & 0 \\ 0 & 0 \end{bmatrix} \begin{bmatrix} V_r^T \\ \tilde{V}_r^T \end{bmatrix}$$

where $U_r=[u_1, u_2, \ldots, u_r]$ are the singular vectors on the left (or output vectors) of A, $\Sigma_r=\text{diag}(\sigma_1, \ldots, \sigma_r)$, and $V_r=[v_1, v_2, \ldots, v_r]$ are the singular vectors on the right (or input vectors) of A. This matrix formulation can also be rewritten as:

$$A = \sum_{i=1}^{r} \sigma_i u_i v_i^T$$

If the sum is limited to an index i<r we obtain a "filtered" matrix which represents only the "predominant" information.

We can also write:

$$Av_i=\sigma_i u_i$$

which shows that matrix A transforms $v_i$ into $\sigma_i$ $u_i$.

The SVD of A has a relation with the eigenvalue decomposition of $A^T$ A and A $A^T$ because:

$$A^TA=V(\Sigma^T\Sigma)V^T$$

$$AA^T=U(\Sigma\Sigma^T)U^T$$

The eigenvalues of $\Sigma^T\Sigma$ and $\Sigma\Sigma^T$ are $\sigma_1^2, \ldots, \sigma_r^2$. The columns of U are the eigenvectors of A $A^T$, while the columns of V are the eigenvectors of $A^T$ A.

The SVD can be interpreted geometrically: the image of a sphere in dimension n by matrix A is, in dimension m, a hyper-ellipse having main axes in directions $u_1, u_2, \ldots, u_m$ and of length $\sigma_1, \ldots, \sigma_m$.

Karhunen-Loève Transform (or "KLT")

The Karhunen-Loève transform (KLT) of a random vector x centered at 0 and of covariance matrix $R_{xx}=E[xx^T]$ is defined by:

$$y=V^Tx$$

where V is the matrix of eigenvectors (with the convention that the eigenvectors are column vectors) obtained by decomposition of $R_{xx}$ into eigenvalues $$R_{xx}=V\Lambda V^T$$

where $\Lambda=\text{diag}(\lambda_1, \ldots, \lambda_n)$ is a diagonal matrix whose coefficients are the eigenvalues. The matrix $V=[v_1, v_2, \ldots, v_n]$ contains the eigenvectors (columns) of $R_{xx}$, such that $$R_{xx}v_i=\lambda_n v_i$$

We can see the KLT as a change of basis, because the product $V^T$ x expresses the vector x in the basis given by the eigenvectors.

The reverse transformation is given by:

$$x=Vy$$

KLT makes it possible to decorrelate the components of x; the variances of the transformed vector y are the eigenvalues of $R_{xx}$.

Principal Component Analysis (or "PCA")

Principal Component Analysis (PCA) is a dimensionality-reduction technique that produces orthogonal variables and maximizes the variance of the variables after projection (or equivalently minimizes the reconstruction error).

The PCA presented below, although also based on a decomposition into eigenvalues such as KLT, is such that the estimated covariance matrix $\hat{R}_{xx}$ is calculated from N observed vectors $x_i$, i=1 . . . N of dimension n:

$$\hat{R}_{xx} = \frac{1}{N-1} \sum_{i=1}^{N} x_i x_i^T$$

assuming that these vectors are centered:

$$m_x = \frac{1}{N} \sum_{i=1}^{N} x_i = 0$$

The decomposition into eigenvalues of $\hat{R}_{xx}$ in the form $\hat{R}_{xx}=V\Lambda V^T$ allows calculating the principal components: $y_n=V^Tx_n$.

PCA is a transformation by the matrix $V^T$ which projects the data into a new basis in order to maximize the variance of the variables after projection.

Note that the PCA can also be obtained from an SVD of the signal $x_i$ put in the form of a matrix X of size n×N. In this case, we can write:

$$X=UDV^T$$

We verify that $XX^T=UDD^TU^T$, which corresponds to a diagonalization of $XX^T$. Thus the projection vectors of the PCA correspond to the column vectors of U and the projection gives $U^TX=DV^T$ as the result.

One will also note that PCA is viewed in general as a dimensionality reduction technique, for "compressing" a set of data of high dimensionality into a set comprising few principal components.

In the invention, PCA advantageously makes it possible to decorrelate the multidimensional input signal, but the elimination of channels (thus reducing the number of channels) is avoided in order to avoid introducing artifacts. This forces a minimum encoding bitrate, to avoid "truncating" the spatial image, except in specific variants where eigenvalues are so low that a zero rate can be allowed (for example to better encode ambisonic sounds created artificially with a single source spatialized synthetically).

Figure 2:
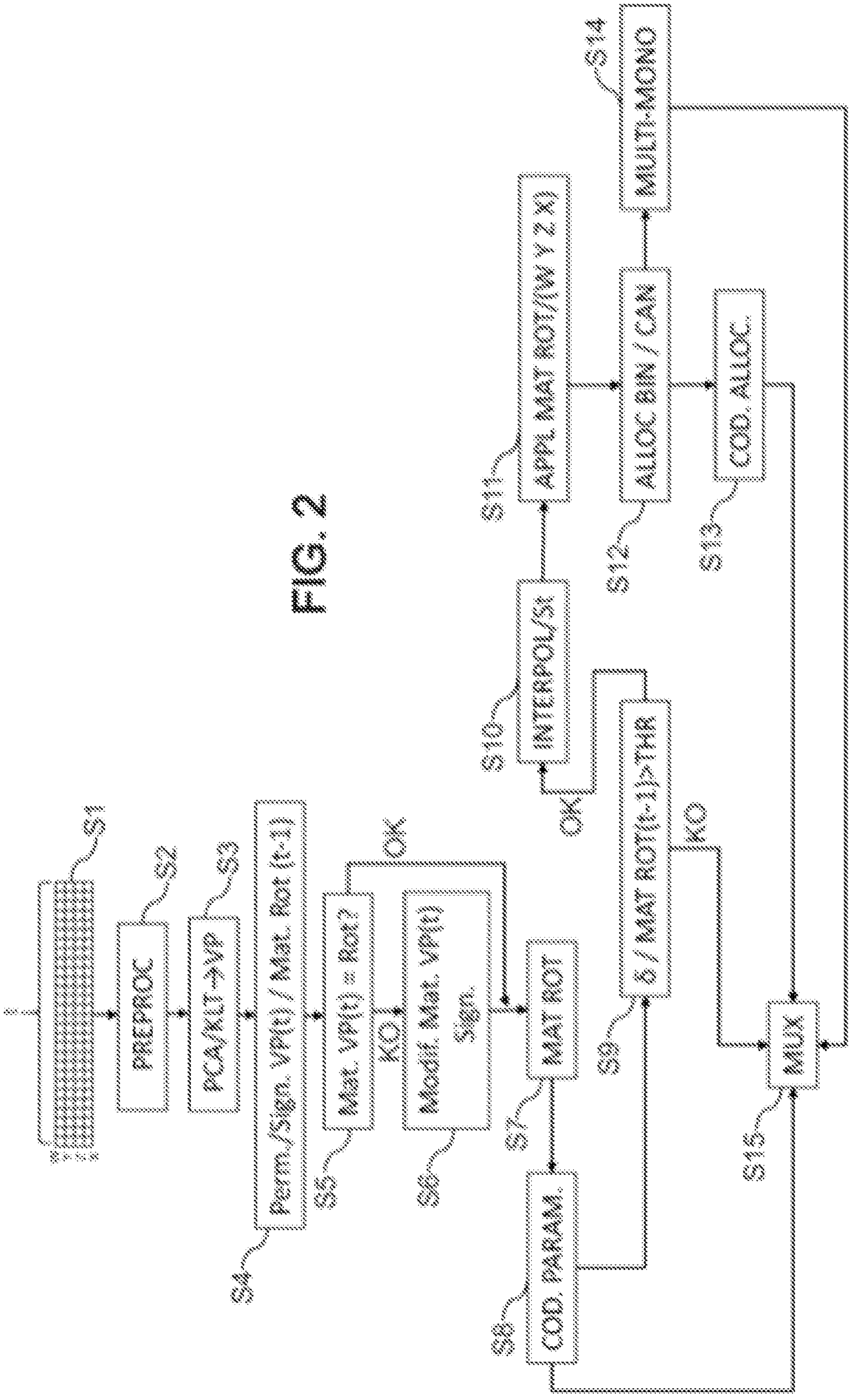
FIG. 2 illustrates a succession of main steps of an example method in the meaning of the invention.

We now refer to FIG. 2 to describe the general principles of the steps which are implemented in a method within the meaning of the invention, for a current frame t.

Step S1 consists of obtaining the respective signals of the ambisonic channels (here four channels W, Y, Z, X in the example described, using the ACN (Ambisonics Channel Number) channel ordering convention for each frame t. These signals can be put in the form of an n×L matrix (for n ambisonic channels (here 4) and L samples per frame).

In the next step S2, the signals of these channels can optionally be pre-processed, for example by a high-pass filter as described below with reference to FIG. 3.

In the next step S3, a principal component analysis PCA or in an equivalent manner a Karhunen-Loève transform KLT is applied to these signals, to obtain eigenvalues and a matrix of eigenvectors from a covariance matrix of the n channels. In variants of the invention, an SVD could be used.

In step S4, this matrix of eigenvectors, obtained for the current frame t, undergoes signed permutations so that it is as aligned as possible with the matrix of the same nature of the previous frame t−1. In principle, we ensure that the axis of the column vectors in the matrix of eigenvectors corresponds as much as possible to the axis of the column vectors at the same place in the matrix of the previous frame, and if not, the positions of the eigenvectors of the matrix of the current frame t which do not correspond are permuted. Then, we also ensure that the directions of the eigenvectors from one matrix to another are also coincident. In other words, initially we are only interested in the straight lines which bear the eigenvectors (just the orientation, without the direction) and for each line we seek the closest line in the matrix of the previous frame t−1. To do this, vectors are permuted in the matrix of the current frame. Then, in a second step, we try to match the orientation of the vectors (directional). To do this, we reverse the sign of the eigenvectors which would not have the right orientation.

Such an embodiment makes it possible to ensure maximum consistency between the two matrices and thus avoid audible clicks between two frames during sound playback.

In step S5, we also ensure that the matrix of eigenvectors of the current frame t, thus corrected by signed permutations, indeed represents the application of a rotation (of an angle for n=2 channels, of three Euler angles, of an axis and an angle, or of a quaternion for n=3 corresponding to the first-order planar ambisonic representation W, Y, Z, and of two quaternions for n=4 in first-order ambisonic representation of type W, Y, Z, X).

To ensure that it is indeed a rotation, the determinant of the matrix of eigenvectors of the current frame t, corrected by permutations, must be positive and equal to (or, in practice, close to)+1 in step S6. If it is equal to (or close to) −1, then one should:

- again permute two eigenvectors (for example associated with low-energy channels, therefore not very representative), or
- preferably invert the sign of all elements of a column (for example associated with a low-energy channel) in step S6.

We then obtain a matrix of eigenvectors for the current frame t effectively corresponding to a rotation in step S7.

Parameters of this matrix (for example such as the angle value, value of an axis and of an angle, or of quaternion(s) of this matrix) can then be encoded in a number of bits allocated for this purpose in step S8. In another optional but advantageous embodiment, in the case where a significant difference is observed in step S9 (greater than a threshold for example) between the rotation matrix estimated for the current frame t and the rotation matrix of the previous frame t−1, a variable number of interpolation subframes can be determined: otherwise this number of subframes is fixed at a predetermined value. Step S10 consists of:

- splitting the current frame into subframes, and
- interpolating matrices to be applied to the successive subframes from the matrix of the previous frame t−1 to the matrix of the current frame t, in order to smooth the difference between the two matrices over time.

In step S11, the interpolated rotation matrices are applied to a matrix n X (L/K) representing each of the K subframes of the signals of the ambisonic channels of step S1 (or optionally S2) in order to decorrelate these signals as much as possible before the multi-mono encoding of step S14. One will recall in fact that we desire to decorrelate these signals as much as possible before this multi-mono transformation, according to a general approach. A bit allocation to the separate channels is done in step S12 and encoded in step S13.

Figure 7:
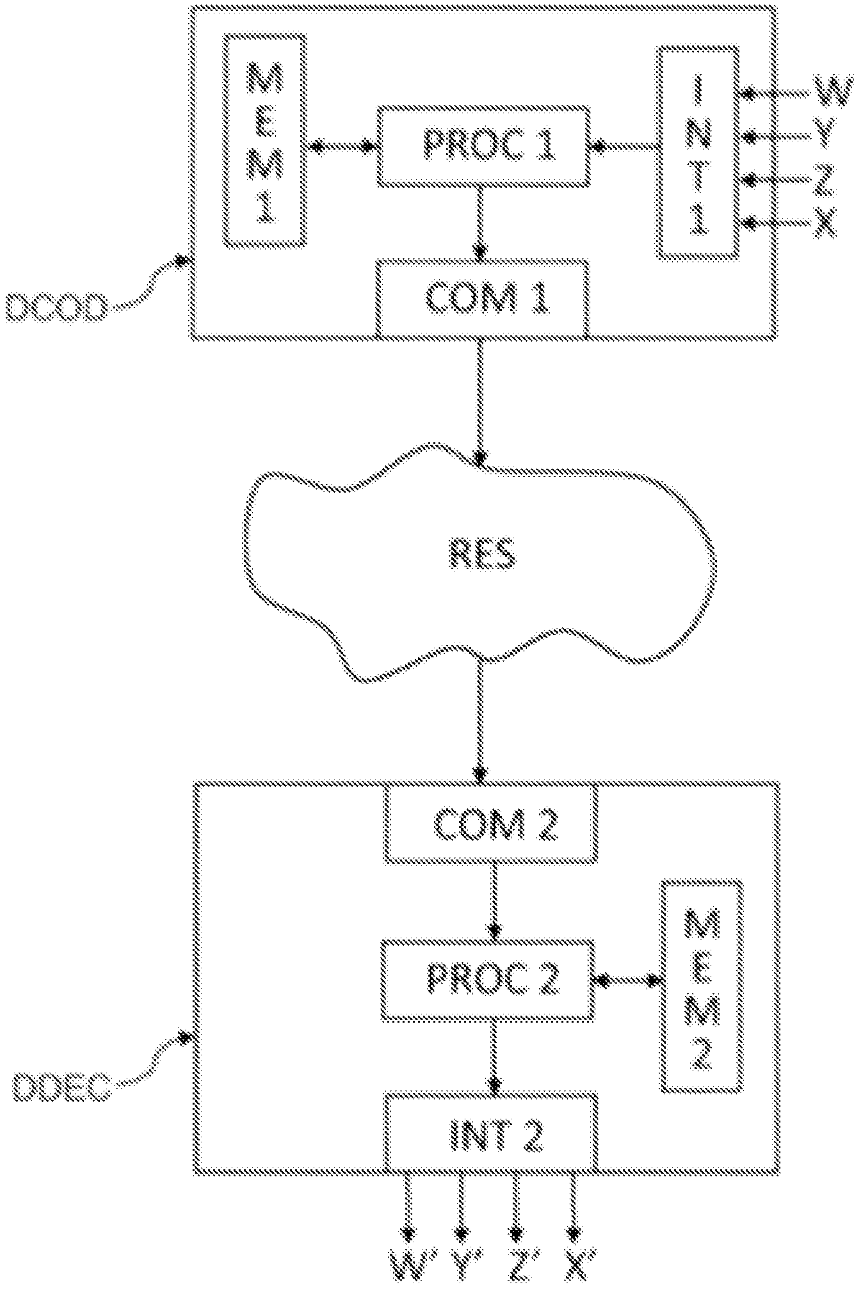
FIG. 7 illustrates structural exemplary embodiments of an encoder and a decoder within the meaning of the invention.

In step S14, before carrying out the multiplexing of step S15 and thus ending the method for compression encoding, it is possible to decide on a number of bits to be allocated per channel as a function of the representativeness of this channel and of the available bitrate on the network RES (FIG. 7). In one embodiment, the energy in each channel is estimated for a current frame and this energy is multiplied by a predefined score for this channel and for a given bitrate (this score being for example a MOS score explained below with reference to FIG. 3). The number of bits to be allocated for each channel is thus weighted. Such an embodiment is advantageous as is, and may possibly be the object of separate protection in an ambisonic context.

Illustrated in FIG. 7 are an encoding device DCOD and a decoding device DDEC within the meaning of the invention, these devices being dual relative to each other (meaning "reversible") and connected to each other by a communication network RES.

The encoding device DCOD comprises a processing circuit typically including:

- a memory MEM1 for storing instruction data of a computer program within the meaning of the invention (these instructions may be distributed between the encoder DCOD and the decoder DDEC);
- an interface INT1 for receiving ambisonic signals distributed over different channels (for example four first-order channels W, Y, Z, X) with a view to their compression encoding within the meaning of the invention;
- a processor PROC1 for receiving these signals and processing them by executing the computer program instructions stored in the memory MEM1, with a view to their encoding; and
- a communication interface COM1 for transmitting the encoded signals via the network.

The decoding device DDEC comprises its own processing circuit, typically including:

- a memory MEM2 for storing instruction data of a computer program within the meaning of the invention (these instructions may be distributed between the encoder DCOD and the decoder DDEC as indicated above);
- an interface COM2 for receiving the encoded signals from the RES network with a view to their decoding from compression within the meaning of the invention;
- a processor PROC2 for processing these signals by executing the computer program instructions stored in the memory MEM2, with a view to their decoding; and
- an output interface INT2 for delivering the decoded signals in the form of ambisonic channels W', Y', Z', X', for example with a view to their playback.

Of course, this FIG. 7 illustrates one example of a structural embodiment of a codec (encoder or decoder) within the meaning of the invention. FIGS. 3 to 6, commented below, detail embodiments of these codecs that are rather more functional.

Figure 3:
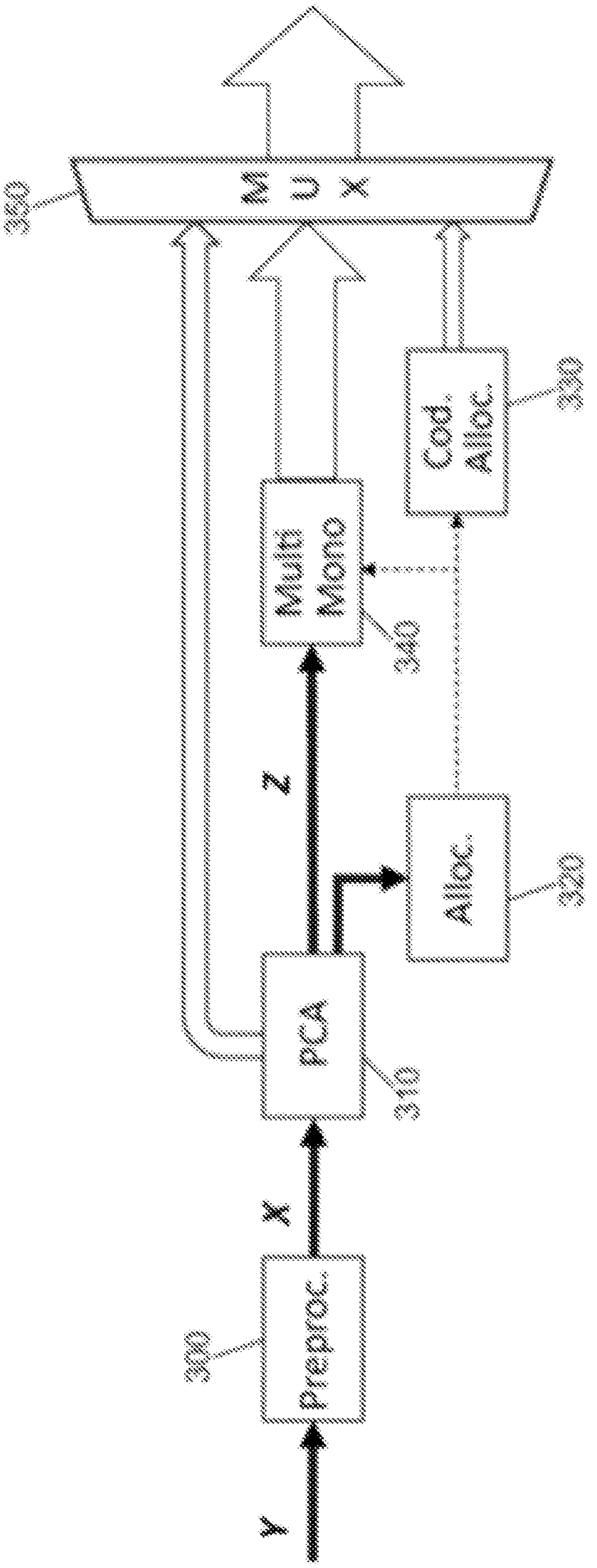
FIG. 3 shows the general structure of an example of an encoder according to the invention.

Reference is now made to FIG. 3 to describe an encoder device within the meaning of the invention.

The strategy of the encoder is to decorrelate the channels of the ambisonic signal as much as possible and to encode them with a core codec. This strategy makes it possible to limit artifacts in the decoded ambisonic signal. More particularly, here we seek to apply an optimized decorrelation of the input channels before multi-mono encoding. In addition, an interpolation which is of limited computation cost for the encoder and decoder because it is carried out in a specific domain (angle in 2D, quaternion in 3D, quaternion pair in 4D) makes it possible to interpolate the covariance matrices calculated for the PCA/KLT analysis rather than repeating a decomposition into eigenvalues and eigenvectors, several times per frame.

However, before discussing the core encoding performed within the meaning of the invention, some features of the encoder which are advantageous are presented here, in particular such as the optimization of the allocated bit budget for encoding as a function of perceptual criteria, seen below.

In the embodiment of the encoder described here, the latter can typically be an extension of the standardized 3GPP EVS (for "Enhanced Voiced Services") encoder. Advantageously, the EVS encoding bitrates can be used without then modifying the structure of the EVS bit stream. Thus, the multi-mono encoding (block 340 of FIG. 3 described below) functions here with a possible allocation to each transformed channel, restricted to the following bitrates for encoding in a super-wide audio band: 9.6; 13.2; 16.4; 24.4; 32; 48; 64; 96 and 128 kbps.

Of course, it is possible to add additional bitrates (to have a more detailed granularity in the allocation) by modifying the EVS codec. It is also possible to use a codec other than EVS, for example the OPUS® codec.

In general, keep in mind that the finer the granularity of the encoding, the more bits must be reserved to represent the possible combinations of bitrates. A compromise between fineness in allocation and additional information describing the bit allocation must be made. This allocation is optimized here by block 320 of FIG. 3, which is described below. This is an advantageous feature in and of itself and independent of the decomposition into eigenvectors in order to establish a rotation matrix within the meaning of the invention. As such, the bit allocation performed by block 320 can be the object of separate protection.

Referring to FIG. 3, block 300 receives an input signal Y in the current frame of index t. The index is not shown here so as not to complicate the labels. This is a matrix of size n×L. In an embodiment adapted to a first-order ambisonic context, we have n=4 channels W, Y, Z, X (thus defined according to the ACN order) which can be normalized according to the SN3D convention. In a variant, the order of the channels can alternatively be for example W, X, Y, Z (following the FuMa convention) and the normalization can be different (N3D or FuMa). Thus the channels W, Y, Z, X correspond to the successive rows: $y_{1,l}$, $y_{2,l}$, $y_{3,l}$, $y_{4,l}$ which will be denoted in the form of one-dimensional signals $y_i(l)$, l=1, . . . , L. This is therefore a succession of samples from 1 to L occupying frame t.

It is assumed that the signal (in each channel) is sampled at 48 kHz, without loss of generality. The frame length is fixed at 20 ms, i.e. L=960 successive samples, without loss of generality.

Alternatively, it is possible for example to use a frame length of L=640 samples for sampling at 32 kHz.

The PCA/KLT analysis and the PCA/KLT transformation which are described below are performed in the time domain. It is thus understood that we remain here in the time domain without necessarily having to perform a sub-band transform or more generally a frequency transform.

At each frame, block 300 of the encoder applies a preprocessing (optional) to obtain the preprocessed input signal denoted Y. This may be a high-pass filtering (with a cutoff frequency typically at 20 Hz) of each new 20 ms frame of the input signal channels. This operation allows removing the continuous component likely to bias the estimate of the covariance matrix so that the signal output from block 300 can be considered to have a zero mean. The transfer function is denoted $H_{pre}(z)$, so we have for each channel: $X_i(z)=H_{pre}(z)Y_i(z)$. If block 300 is not applied we have X=Y. A low-pass filter in block 340 may also be applied for performing the multi-mono encoding but when block 300 is applied, the high-pass filtering during preprocessing of the mono encoding which can be used in block 340 is preferably disabled, to avoid repeating the same preprocessing and thus reduce the overall complexity.

The transfer function denoted $H_{pre}(z)$ above can be of the type:

$$H_{pre}(z) = \frac{b_0 + b_1 z^{-1} + b_2 z^{-2}}{1 - a_1 z^{-1} - a_2 z^{-2}}$$

by applying this filter to each of the n channels of the input signal, for which the coefficients may be as shown in the table below:

| | 8 kHz | 16 kHz | 32 kHz | 48 kHz |
|---|---|---|---|---|
| $b_0$ | 0.988954248067140 | 0.994461788958.195 | 0.997227049904470 | 0.998150511190452 |
| $b_1$ | −1.977908496134280 | −1.988923577916390 | −1.994454099808940 | −1.996301022380904 |
| $b_2$ | 0.988954248067140 | 0.994461788958195 | 0.997227049904470 | 0.998150511190452 |

-continued

| | 8 kHz | 16 kHz | 32 kHz | 48 kHz |
|---|---|---|---|---|
| $a_1$ | 1.977786483776764 | 1.988892905899653 | 1.994446410541927 | 1.996297601769122 |
| $a_2$ | −0.978030508491796 | −0.988954249933127 | −0.994461789075954 | −0.996304442992686 |

Alternatively, another type of filter can be used, for example a sixth-order Butterworth filter with a frequency of 50 Hz.

In some variants, the preprocessing could include a fixed matrixing step which could maintain the same number of channels or reduce the number of channels. An example of matrixing applied to the four channels of an ambisonic signal in B-format is given below:

$$M_{B\to A}=\begin{bmatrix} 1/2 & \frac{1}{\sqrt{6}} & 0 & \frac{1}{\sqrt{12}} \\ 1/2 & \frac{-1}{\sqrt{6}} & 0 & \frac{1}{\sqrt{12}} \\ 1/2 & 0 & \frac{1}{\sqrt{6}} & \frac{-1}{\sqrt{12}} \\ 1/2 & 0 & \frac{-1}{\sqrt{6}} & \frac{-1}{\sqrt{12}} \end{bmatrix}$$

Note that in this case this preprocessing will have to be reversed at decoding by applying a matrixing of the decoded signal via $M_{A\to B}=M_{B\to A}^{-1}$, to find the channels in the original format.

The next block 310 estimates, at each frame t, a transformation matrix obtained by determining the eigenvectors by PCA/KLT and verifying that the transformation matrix formed by these eigenvectors indeed characterizes a rotation. Details of the operation of block 310 are given further below with reference to FIG. 4. This transformation matrix performs a matrixing of the channels in order to decorrelate them, making it possible to apply an independent multi-mono type of encoding by block 340. As detailed below, block 310 sends to the multiplexer quantization indices representing the transformation matrix and, optionally, information encoding the number of interpolations of the transformation matrix, per subframe of the current frame t, as is also detailed below.

Block 320 determines the optimal bitrate allocation for each channel (after PCA/KLT transformation) based on a given budget of B bits. This block looks for a distribution of the bitrate between channels by calculating a score for each possible combination of bitrates; the optimal allocation is found by looking for the combination that maximizes this score.

Several criteria can be used to define a score for each combination.

For example, the number of possible bitrates for the mono encoding of a channel can be limited to the nine discrete bitrates of the EVS codec having a super-wide audio band: 9.6; 13.2; 16.4; 24.4; 32; 48; 64; 96 and 128 kbps. However, if the codec according to the invention operates at a given bitrate associated with a budget of B bits in the current frame of index t, in general only a subset of these listed bitrates can be used. For example, if the codec bitrate is fixed at 4×13.2=52.8 kbps to represent four channels and if each channel receives a minimum budget of 9.6 kbps to guarantee a super-wide band for each of the channels, the possible combinations of bitrates for encoding separate channels must respect the constraint that the bitrate used remains lower than the available bitrate which corresponds to:

$$B_{multimono}=B-B_{overhead},$$

where $B_{overhead}$ is the bit budget for the additional information encoded per frame (bit allocation+rotation data) as described below. For example, $B_{overhead}$ can be on the order of $B_{overhead}$=55 bits per 20 ms frame (i.e. 2.75 kbps) for the case of four-channel ambisonic encoding; this includes 51 bits for encoding the rotation matrix and 4 bits (as described below) for encoding the bit allocation for the encoding of separate channels. For an overall bitrate of 4×13.2=52.8 kbps, this therefore leaves a budget of $B_{muitimono}$=50.05 kbps.

In terms of bitrates per channel, this gives the following permutations of bitrates per channel:

Singleton (9.6, 9.6, 9.6, 9.6)–total=38.4

Permutations of (13.2, 9.6, 9.6, 9.6)–total=42 kbps

Permutations of (13.2, 13.2, 9.6, 9.6)–total=45.6 kbps

Permutations of (13.2, 13.2, 13.2, 9.6)–total=49.2 kbps

Permutations of (16.4, 9.6, 9.6, 9.6)–total=45.2 kbps

Permutations of (16.4, 13.2, 9.6, 9.6)–total=48.8 kbps

One can see that some combinations respecting the maximum budget limit have a much lower bitrate than others, and finally only two relevant combinations can be retained:

Permutations of (13.2, 13.2, 13.2, 9.6)—4 cases and unused bitrate of 50.5-49.2=1.3 kbps and Permutations of (16.4, 13.2, 9.6, 9.6)—12 cases and unused bitrate of 50.5-48.8=1.7 kbps This makes it possible to illustrate that sixteen combinations are of particular interest and can be encoded in 4 bits (16 values). In addition, a certain number of bits remain potentially unused depending on the allocation chosen.

One can see that the encoding of the adaptive matrixing based on PCA/KLT processing and allowing flexible bit allocation can result in unused bits and, for some channels, a lower bitrate (for example 9.6 kbps) than the bitrate equally distributed among each of the channels (for example 13.2 kbps per channel).

To improve this situation, block 320 can then evaluate all possible (relevant) combinations of bitrates for the 4 channels resulting from the PCA/KLT transformation (output from block 310) and assign a score to them. This score is calculated based on:

the energy of each channel, and an average score which can be stored beforehand and result from subjective or objective tests; this score, denoted MOS (for "Mean Opinion Score", which is an average score for a panel of testers), is associated with the allocated bitrate.

This score can then be defined by the equation $$S(b_{t,1}, \ldots , b_{t,n}) = \sum_{i=1}^{n} Q(b_{t,i}) \cdot E_i$$

where $E_i$ is the energy in the current frame (of index t) of signal s(l), l= . . . L−1 on channel i, with:

$$E_i = \sum_{l=0}^{L-1} s^2(l)$$

The optimal allocation can be such that:

$$b_{t,1}^{opt}, \ldots, b_{t,1}^{opt} = \arg \max_{b_{t,1}, \ldots, b_{t,n} \mid \sum_{i=1}^{n} b_{t,i} \leq B} S(b_{t,1}, \ldots, b_{t,n})$$

Alternatively, the factor $E_i$ can be fixed at the value taken by the eigenvalue associated with the channel i resulting from decomposition into eigenvalues of the signal that is input to block 310 and after a possible signed permutation.

The MOS score $Q(b_i)$ is preferably the subjective quality score of the codec used for the multi-mono encoding in block 340 for a budget $b_i$ (in numbers of bits) per 20 ms frame corresponding to a bitrate $R_i=50\ b_i$ (in bits/sec). To start with, we can use the (average) subjective MOS scores of an EVS standardized encoder given by:

| $\kappa_i$ | 0 | 1 | 2 | 3 | 4 | 5 | 6 | 7 | 8 |
|---|---|---|---|---|---|---|---|---|---|
| $b_i$ | 192 | 264 | 328 | 488 | 640 | 960 | 1280 | 1920 | 2560 |
| $R_i$ | 9600 | 13200 | 16400 | 24400 | 32000 | 48000 | 64000 | 96000 | 128000 |
| Q ($b_i$) | 3.62 | 3.79 | 4.25 | 4.60 | 4.53 | 4.82 | 4.83 | 4.85 | 4.87 |

Alternatively, other MOS score values for each of the listed bitrates can be derived from other tests (subjective or objective) predicting the quality of the codec. It is also possible to adapt the MOS scores used in the current frame, according to a classification of the type of signal (for example a speech signal without background noise, or speech with ambient noise, or music or mixed content), by reusing classification methods implemented by the EVS codec and by applying them to the W channel of the ambisonic input signal before performing the bit allocation. The MOS score can also correspond to a mean score resulting from different types of methodologies and rating scales: MOS (absolute) from 1 to 5, DMOS (from 1 to 5), MUSHRA (from 0 to 100).

In a variant where the EVS encoder is replaced by another codec, the list of bitrates $b_i$ and the scores $Q(b_i)$ can be replaced on the basis of this other codec. It is also possible to add additional encoding bitrates to the EVS encoder and therefore supplement the list of bitrates and MOS scores, or even to modify the EVS encoder and potentially the associated MOS scores.

In another alternative, the allocation between channels is refined by weighting the energy by a power a where a takes a value between 0 and 1. By varying the value of $\alpha$, we can thus control the influence of the energy in the allocation: the closer $\alpha$ is to 1, the more significant the energy is in the score, and therefore the more unequal the allocation between channels. Conversely, the closer $\alpha$ is to 0, the less significant the energy is and the more evenly distributed the allocation between channels. The score is therefore expressed in the form:

$$S(b_{t,1}, \ldots, b_{t,n}) = \sum_{i=1}^{n} Q(b_{t,i}) \cdot E_i^{\alpha}$$

In another alternative, to make the allocation more stable, a second weighting can be added to the score function to penalize inter-frame bitrate changes. A penalty is added to the score if the bitrate combination is not the same in frame t as in frame t−1. The score is then expressed in the form:

$$S(b_{t,1}, \ldots, b_{t,n}) = \sum_{i=1}^{n} Q(b_{t,i}) \cdot E_i^{\alpha} \cdot (1 + \beta_i)$$

where $\beta_i$ has a predetermined constant as its value (for example 0.1) when $b_{t,i}=b_{t-1,i}$, and $\beta_i=0$ when $b_{t,i}\neq b_{t-1,i}$.

This additional weighting makes it possible to limit overly-frequent fluctuations in the bitrate between channels. With this weighting, only significant changes in energy result in a change in bitrate. In addition, the value of the constant can be varied to adjust the stability of the allocation.

Again with reference to FIG. 3, once the bitrate has been calculated for each frame, this bitrate is encoded by block 330, for example exhaustively for all bitrate combinations. In the case of 9 bitrates and 4 channels, the required bitrate is $\lceil \log_2(9^4) \rceil=13$ bits, where $\lceil . \rceil$ corresponds to rounding up to the next integer. The combination of the 4 bitrates can be encoded in the form of the index: $\Sigma_{i=1}^{n} 9^i \kappa_i$. However, one may prefer to enumerate (initially, off-line) the different combinations of bitrates relevant for the given bit budget and to use the minimum bitrate to represent these combinations. The index can then be represented by a "permutation code"+"combination offset" type of encoding; for example, in the example where we use a 4-bit index to encode the 16 bitrate combinations comprising 4 permutations of (13.2, 13.2, 13.2, 9.6) and 12 permutations of (16.4, 13.2, 9.6, 9.6), we can use the indices 0-3 to encode the first 4 possible permutations (with an offset at 0 and a code ranging from 0 to 3) and the indices 4-15 to encode the 12 other possible permutations (with an offset at 4 and a code of 0 to 11).

Referring again to FIG. 3, the multiplexing block 350 takes as input the n matrixed channels coming from block 310 and the bitrates allocated to each channel coming from block 320 in order to then separately encode the different channels with a core codec which corresponds to the EVS codec for example. If the core codec used allows stereo or multichannel encoding, the multi-mono approach can be replaced by multi-stereo or multichannel encoding. Once the channels are encoded, the associated bit stream is sent to the multiplexer (block 350).

In frames where a part of the overall budget is not fully used, the multiplexer (block 350) can apply zero-bit stuffing to reach the bit budget allocated to the current frame, i.e. $B-\Sigma_{i=1}^{n} b_{t,i}^{opt}$ bits.

Alternatively, the remaining bit budget can be redistributed for encoding the transformed channels in order to use the entire available budget and if the multi-mono encoding is based on an EVS type technology, then the specified 3GPP EVS encoding algorithm can be modified to introduce additional bitrates. In this case, it is also possible to integrate these additional bitrates in the table defining the correspondence between $b_i$ and $Q(b_i)$.

A bit can also be reserved in order to be able to switch between two modes of encoding:

encoding according to the invention with encoding of the rotation matrix, and encoding according to the invention with a rotation matrix restricted to the identity matrix (therefore not transmitted) which amounts to direct multi-mono encoding if the rotation matrix of the previous frame was also an identity matrix (for example when the ambisonic signal comprises very diffuse sound sources or multiple sources spatially spread out around certain preferred directions, in which case the ambisonic channels are less correlated than for sounds mixing more isolated point sources).

The choice between these two modes implies using a bit in the stream to indicate whether the current frame uses a rotation matrix restricted to the identity matrix without transmission of rotation parameters (bit=0) or if a rotation matrix is encoded (bit=1). When bit=0, it is possible in some variants to use an allocation of fixed bits to the separate channels and not transmit a bit allocation.

Figure 4:
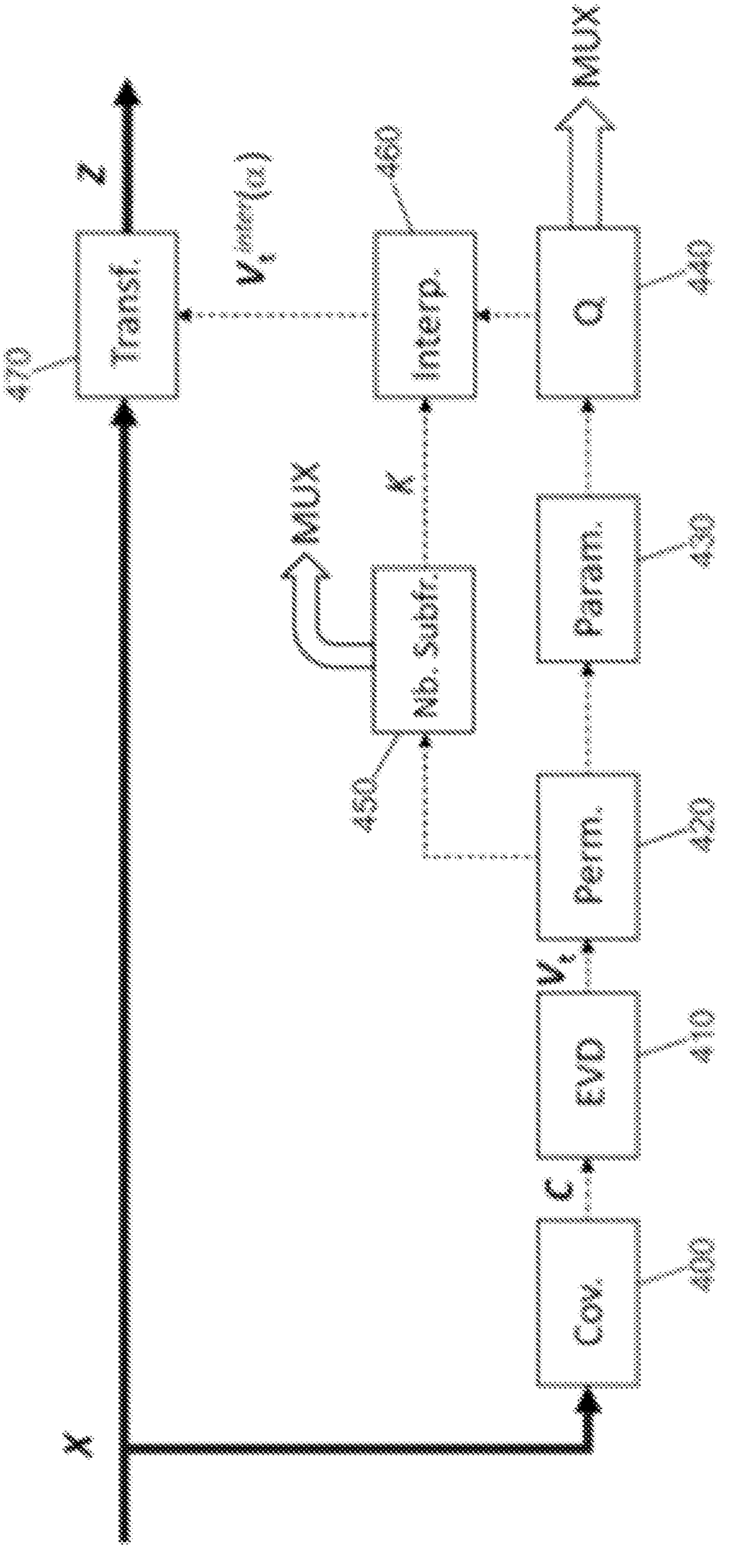
FIG. 4 shows details of the PCA/KLT analysis and transformation performed by block 310 of the encoder of FIG. 3.

Reference is now made to FIG. 4 to describe in detail block 310 which applies the PCA/KLT analysis and transformation. In this block, the encoder calculates the covariance matrix from the ambisonic (preprocessed) channels in block 400:

$$C = \frac{1}{L-1} X X^T$$

Alternatively, this matrix can be replaced by the correlation matrix, where the channels are pre-normalized by their respective standard deviation, or in general weights reflecting a relative importance can be applied to each of the channels; moreover, the normalization term 1/(L−1) can be omitted or replaced by another value (for example 1/L). The values $C_{ij}$ correspond to the variance between $x_i$ and $x_j$.

The encoder then performs, in block 410, a decomposition into eigenvalues (EVD for "Eigenvalue Decomposition"), by calculating the eigenvalues and the eigenvectors of the matrix C. The eigenvectors are denoted $V_t$ here to indicate the index of frame t because the eigenvectors $V_{t-1}$ obtained in the previous frame of index t−1 are preferably stored and subsequently used. The eigenvalues are denoted $\lambda_1, \lambda_2, \ldots, \lambda_n$.

Alternatively, a singular value decomposition (SVD) of the preprocessed channels X can be used. We thus obtain the singular vectors (U on the left and V on the right) and the singular values $\sigma_i$. In this case we can consider that the eigenvalues $\lambda_i$ are $\lambda_i=\sigma_i^2$ and the eigenvectors $V_t$ are given by the n singular vectors (column) on the left U.

The encoder then applies, in block 420, a first signed permutation of the columns of the transformation matrix for frame t (in which the columns are the eigenvectors) in order to avoid too much disparity with the transformation matrix of the previous frame t−1, which would cause problems with clicks at the border with the previous frame.

Thus, once a rough draft of the transformation matrix is obtained for frame t, block 430 takes n estimated eigenvectors $V_t=v_{t,0}, \ldots, v_{t,n}$ from the current frame of index t and n eigenvectors $V_{t-1}$ stored from the previous frame of index t−1, and applies a signed permutation on the estimated vectors $V_t$ so that they are as close as possible to $V_{t-1}$. Thus the eigenvectors of frame t are permuted so that the associated basis is as close as possible to the basis of frame t−1. This has the effect of improving the continuity of the frames of transformed signals (after the transformation matrix is applied to the channels).

Another constraint is that the transformation matrix must correspond to a rotation. This constraint ensures that the encoder can convert the transformation matrix into generalized Euler angles (block 430) in order to quantize them (block 440) with a predetermined bit budget as seen above. For this purpose, the determinant of this matrix must be positive (typically equal to +1).

Preferably, the optimal signed permutation is obtained in two steps:

The first step (S4 in FIG. 2 presented above) matches the closest vectors between two frames, paying attention only to the axis and not to the direction (orientation) of the axis. This problem can be formulated as a combinatorial problem of task assignment, where the goal is to find the configuration which minimizes a cost. The cost can be defined here as the trace of the absolute value of the inter-correlation between the eigenvector matrices of frames t and t−1.

$$C_t = tr(\text{abs}(\text{corr}(V_t, V_{t-1})))$$

where tr(.) denotes the trace of a matrix, abs(.) amounts to applying the absolute value operation to all coefficients of a matrix, and corr(V1, V2) gives the correlation matrix between vectors V1 and V2.

In one embodiment, the "Hungarian" method (or "Hungarian algorithm") is used to determine the optimal assignment which gives a permutation of the eigenvectors of frame t;

The second step (S6 in FIG. 2) consists of determining the direction/orientation of each permuted eigenvector. Block 420 calculates the inter-correlation between the permuted eigenvectors $\tilde{V}_t$ of frame t and the eigenvector of frame t−1

$$\Gamma_t = \text{corr}(\tilde{V}_t, V_{t-1})$$

If a value on the diagonal of the inter-correlation matrix $\Gamma_t$ is negative, this denotes a change in sign between the directions of eigenvectors. A sign inversion is then performed on the corresponding eigenvector in $\tilde{V}_t$.

At the end of the two steps, the transformation matrix at frame t is designated by $V_t$ such that at the next frame the stored matrix becomes $V_{t-1}$.

Alternatively, the search for the optimal signed permutation can be done by calculating the change of basis matrix $V_{t-1}^{-1}V_t$ or $V_tV_{t-1}^{-1}$ which is converted to 3D or 4D and by converting this change of basis matrix respectively into a unit quaternion or two unit quaternions. The search then becomes a nearest neighbor search with a dictionary representing the set of possible signed permutations. For example, in the 4D case the twelve possible even permutations (out of 24 total permutations) of 4 values are associated with the following pairs of unit quaternions written as 4D vectors:

(1,0,0,0) and (1,0,0,0)
(0,0,0, 1) and (0, 0, −1, 0)
(0, 1, 0, 0) and (0, 0, 0, −1)
(0, 0, 1, 0) and (0, −1, 0, 0)]
(0.5, −0.5, −0.5, −0.5) and (0.5, 0.5, 0.5, 0.5)
(0.5, 0.5, 0.5, 0.5) and (0.5, −0.5, −0.5, −0.5)
(0.5, −0.5, 0.5, −0.5) and (0.5, −0.5, 0.5, 0.5)
(0.5, −0.5, 0.5, 0.5) and (0.5, −0.5, −0.5, 0.5)

(0.5, 0.5, −0.5, 0.5) and (0.5, 0.5, −0.5, −0.5)
(0.5, −0.5, −0.5, 0.5) and (0.5, 0.5, −0.5, 0.5)
(0.5, 0.5, −0.5, −0.5) and (0.5, 0.5, 0.5, −0.5)
(0.5, 0.5, 0.5, −0.5) and (0.5, −0.5, 0.5, −0.5)

The search for the (even) optimal permutation can be done by using the above list as a dictionary of predefined quaternion pairs and by performing a nearest neighbor search against the quaternion pair associated with the change of basis matrix. An advantage of this method is the reusing of rotation parameters of the quaternion and quaternion-pair type.

The operation which is implemented in the next block 460 assumes that the transformation matrix after signed permutation is indeed a rotation matrix; the transformation matrix is necessarily unitary, but its determinant must also be equal to 1

$$\det(V_t)=1$$

However, the transformation matrix resulting from blocks 410 and 420 (after EVD and signed permutations) is an orthogonal (unitary) matrix which can have a determinant of −1 or 1, meaning a reflection or rotation matrix.

If the transformation matrix is a reflection matrix (if its determinant is equal to −1), it can be modified into a rotation matrix by inverting an eigenvector (for example the eigenvector associated with the lowest value) or by inverting two columns (eigenvectors).

Certain methods of eigenvector decomposition (for example by Givens rotation) or of singular value decomposition can lead to transformation matrices which are intrinsically rotation matrices (with a determinant of +1); in this case, the step of verifying that the determinant is +1 will be optional.

Block 430 converts the rotation matrix into parameters. In the preferred embodiment, an angular representation is used for the quantization (6 generalized Euler angles for the 4D case, 3 Euler angles for the 3D case, and one angle in 2D). For the ambisonic case (four channels) we obtain six generalized Euler angles according to the method described in the article "Generalization of Euler Angles to N-Dimensional Orthogonal Matrices" by David K. Hoffman, Richard C. Raffenetti, and Klaus Ruedenberg, published in the Journal of Mathematical Physics 13, 528 (1972); for the case of planar ambisonics (three channels) we obtain three Euler angles, and for the stereo case we obtain a rotation angle according to methods well known in the state of the art. The values of the angles are quantized in block 440 with a predetermined bit budget. In the preferred embodiment, a scalar quantization is used and the quantization step size is for example identical for each angle. For example, in the case of 4 channels we encode 6 generalized Euler angles with 3x(8+9)=51 bits (3 angles defined in an interval of $[-\pi/2, \pi/2]$ encoded in 8 bits with a step size of $\pi/256$ and the 3 other angles defined in an interval of $[-\pi, \pi]$ encoded in 9 bits with a step size of $\pi/256$). The quantization indices of the transformation matrix are sent to the multiplexer (block 350). In addition, block 440 may convert the quantized parameters into a quantized rotation matrix $\hat{V}_t$, if the parameters used for quantization do not match the parameters used for interpolation.

Alternatively, blocks 430 and 440 can be replaced as follows:

Block 430 can perform a conversion of the rotation matrices into a pair of unit quaternions (case of 4 channels), into a unit quaternion (case of 3 channels), and into an angle (case of 2 channels).

This conversion into a pair of quaternions for the 4D case can be carried out for a rotation matrix whose coefficients are denoted R[i,j], i,j=0 . . . 3, by the following pseudo-code:

Calculation of the associated matrix A[i, j] with:

$$A[0,0]=R[0,0]+R[1,1]+R[2,2]+R[3,3]$$

$$A[1,0]=R[1,0]-R[0,1]+R[3,2]-R[2,3]$$

$$A[2,0]=R[2,0]-R[3,1]-R[0,2]+R[1,3]$$

$$A[3,0]=R[3,0]+R[2,1]-R[1,2]-R[0,3]$$

$$A[0,1]=R[1,0]-R[0,1]-R[3,2]+R[2,3]$$

$$A[1,1]=-R[0,0]-R[1,1]+R[2,2]+R[3,3]$$

$$A[2,1]=-R[3,0]-R[2,1]-R[1,2]-R[0,3]$$

$$A[3,1]=R[2,0]-R[3,1]+R[0,2]-R[1,3]$$

$$A[0,2]=R[2,0]+R[3,1]-R[0,2]-R[1,3]$$

$$A[1,2]=R[3,0]-R[2,1]-R[1,2]+R[0,3]$$

$$A[2,2]=-R[0,0]+R[1,1]-R[2,2]+R[3,3]$$

$$A[3,2]=-R[1,0]-R[0,1]-R[3,2]-R[2,3]$$

$$A[0,3]=R[3,0]-R[2,1]+R[1,2]-R[0,3]$$

$$A[1,3]=-R[2,0]-R[3,1]-R[0,2]-R[1,3]$$

$$A[2,3]=R[1,0]+R[0,1]-R[3,2]-R[2,3]$$

$$A[3,3]=-R[0,0]+R[1,1]+R[2,2]-R[3,3]$$

$$A=A/4$$

Calculation of the 2 quaternions from the associated matrix

A2=square (A) # square of coefficients
q1=sqrt (A2.sum (axis=1)) # sum the rows
q2=sart (A2.sum (axis=0)) # sum the columns
Determination of Signs
For k=0 . . . 3: If sign(A[i,k])<0, Then q2[k]=−q2[k]
For k=0 . . . 3: If sign(A[k,j])!=sign(q1[k]*q2[j]), Then q1[k]=−q1[k]

The conversion to quaternion for the 3D case can be carried out as follows for a matrix R[i,j] i,j=0 . . . 2 of size 3×3:

Calculation of the simplified associated matrix:

$$q[0]=(R[0,0]+R[1,1]+R[2,2]+1)\hat{}2+(R[2,1]-R[1,2])\hat{}2+(R[0,2]-R[2,0])\hat{}2+(R[1,0]-R[0,1])\hat{}2$$

$$q[1]=(R[2,1]-R[1,2])\hat{}2+(R[0,0]-R[1,1]-R[2,2]+1)\hat{}2+(R[1,0]+R[0,1])\hat{}2+(R[2,0]+R[0,2])\hat{}2$$

$$q[2]=(R[0,2]-R[2,0])\hat{}2+(R[1,0]+R[0,1])\hat{}2+(R[1,1]-R[0,0]-R[2,2]+1)\hat{}2+(R[2,1]+R[1,2])\hat{}2$$

$$q[3]=(R[1,0]-R[0,1])\hat{}2+(R[2,0]+R[0,2])\hat{}2+(R[2,1]+R[1,2])\hat{}2+(R[2,2]-R[0,0]-R[1,1]+1)\hat{}2$$

For i=0 . . . 3: q[i]=sqrt(q[i])/4
Calculation of quaternion q
If (R[2,1]−R[1,2])<0, q[1]=−q[1]
If (R[0,2]−R[2,0])<0, q[2]=−q[2]
If (R[1,0]−R[0,1])<0, q[3]=−q[3]

For the case of a 2×2 matrix the angle is calculated according to already known methods of the state of the art.

In some variants, the unit quaternions q1, q2 (4D case) and q (3D case) can be converted into axis-angle representations known in the state of the art.

Block 440 can perform a quantization in the indicated domain:

Case of 4 channels: the pair of unit quaternions $q_1$ and $q_2$2 is quantized by a spherical quantization dictionary in dimension 4; by convention, $q_1$ is quantized with a hemispherical dictionary (because $q_i$ and $-q_i$ correspond to the same 3D rotation) and $q_2$ is quantized with a spherical dictionary. Examples of dictionaries can be given by predefined points based on polyhedra of 4 dimensions; in some variants, it is possible to quantize a double associated axis-angle representation which would be equivalent to the quaternion pair;

Case of 3 channels: the unit quaternion is quantized by a spherical quantization dictionary in 4 dimensions—examples of dictionaries can be given by predefined points based on polyhedra of 4 dimensions;

Case of 2 channels: the angle is quantized by uniform scalar quantization.

We now describe block 460 for interpolation of the rotation matrices between two successive frames. It smoothes out discontinuities in the channels after application of these matrices. Typically, if two sets of angles or quaternions are too different from a previous frame t−1 to the next frame t, audible clicks are a concern if a smoothed transition has not been applied between these two frames, in subframes between these two frames. A transitional interpolation is then carried out between the rotation matrix calculated for frame t−1 and the rotation matrix calculated for frame t. The encoder interpolates, in block 460, the (quantized) representation of the rotation between the current frame and the previous frame in order to avoid excessively rapid fluctuations of the various channels after transformation. The number of interpolations can be fixed (equal to a predetermined value) or adaptive. Each frame is then divided into subframes as a function of the number of interpolations determined in block 450. Thus, if an adaptive interpolation is used, block 450 can encode in a chosen number of bits the number of interpolations to be performed, and therefore the number of subframes to be provided, in the case where this number is determined adaptively; in the case of a fixed interpolation, no information has to be encoded.

Next, block 460 converts the rotation matrices to a specific domain representing a rotation matrix. The frame is divided into subframes, and in the chosen domain the interpolation is carried out for each subframe.

For a first-order ambisonic input signal (with 4 channels W, X, Y, Z), in block 460, the encoder reconstructs a quantized 4D rotation matrix from the 6 quantized Euler angles and this is then converted to two unit quaternions for interpolation purposes. In a variant where the input to the encoder is a planar ambisonic signal (3 channels W, X, Y), in block 460 the encoder reconstructs a quantized 3D rotation matrix from the 3 quantized Euler angles and this is then converted to a unit quaternion for interpolation purposes. In a variant where the encoder input is a stereo signal, the encoder uses, in block 460, the representation of the 2D rotation quantized with a rotation angle.

In the embodiment with 4 channels, for interpolation of the rotation matrix between frame t and frame t−1, the rotation matrix calculated for frame t is factored into two quaternions (a quaternion pair) by means of Cayley's factorization and we use the quaternion pair stored for the previous frame t−1 and denoted $(Q_{L,t-1}, Q_{R,t-1})$.

For each subframe, the quaternions are interpolated two by two in each subframe.

For the left quaternion $(Q_{L,t})$, the block determines the shortest path between the two possible ($Q_{L,t}$ or $-Q_{L,t}$). Depending on the case, the sign of the quaternion of the current frame is inverted. Then the interpolation is calculated for the left quaternion using spherical linear interpolation (SLERP):

$$Q_{L,interp}(\alpha) = Q_{L,t-1}\frac{\sin(1-\alpha)\Omega_L}{\sin\Omega_L} + Q_{L,t}\frac{\sin\alpha\Omega_L}{\sin\Omega_L}$$

where α corresponds to the interpolation factor (α=1/K, 2/K, . . . 1), and $\Omega_L=\arccos(Q_{L,t-1}\cdot Q_{L,t})$ For the right quaternion $(Q_{R,t})$, if there was an inversion for the left quaternion then we must maintain parity and force the sign of the right quaternion. This sign constraint is hereinafter referred to as the "joint shortest-path constraint". Then the interpolation is calculated similarly to the left quaternion:

$$Q_{R,interp}(\alpha) = Q_{R,t-1}\frac{\sin(1-\alpha)\Omega_R}{\sin\Omega_R} + Q_{R,t}\frac{\sin\alpha\Omega_R}{\sin\Omega_R}$$

where α corresponds to the interpolation factor (α=1/K, 2/K, . . . 1) and $\Omega_R=\arccos(Q_{R,t-1}\cdot Q_{R,t})$ Once the interpolation has been calculated for the two quaternions, the rotation matrix of dimension 4×4 is calculated (respectively 3×3 for planar ambisonics or 2×2 for the stereo case). This conversion into a rotation matrix can be carried out according to the following pseudo-code: 4D case: for a quaternion pair As previously described, the quaternion and anti-quaternion matrices are calculated and the matrix product is calculated.

3D case: for quaternion q=(w, x, y, z) we obtain the matrix M[i,j], i,j=0 . . . 2, of size 3×3

$xy=2*x*y$ $xz=2*x*z$ $yz=2*y*z$ $wx=2*w*x$ $wy=2*w*y$ $wz=2*w*z$ $xx=2*x*x$ $yy=^2*y*y$ $zz=2*z*z$ $M[0][0]=1-(yy+zz)$ $M[0][1]=(xy-wz)$ $M[0][2]=(xz+wy)$ $M[1][0]=(xy+wz)$ $M[1][1]=1-(xx+zz)$ $$M[1][2]=(yz-wx)$$

$$M[2][0]=(xz-wy)$$

$$M[2][1]=(yz+wx)$$

$$M[2][2]=1-(xx+yy);$$

Finally, the matrices $V_t^{interp}(\alpha)$ (or their transposes) computed per subframe in the interpolation block 460 are then used in the transformation block 470 which produces n channels transformed by applying the rotation matrices thus found to the ambisonic channels that have been preprocessed by block 300.

Below, we return to the number K of subframes to be determined in block 450 for the case where this number is adaptive. The final difference between the current frame and the previous frame is measured, or determined directly from the angular difference of the parameters describing the rotation matrix. In the latter case, we want to ensure that the angular variation between successive subframes is not perceptible. The implementation of an adaptive number of subframes is especially advantageous for reducing the average complexity of the codec, but if reducing the complexity is chosen, it may be preferable to use an interpolation with a fixed number of subframes.

The final difference between the corrected rotation matrix of frame t and the rotation matrix of frame t−1 gives a measure of the magnitude of the difference in channel matrixing between the two frames. The larger this difference, the greater the number of subframes for the interpolation done in block 460. To measure this difference, we use the sum of the absolute value of the inter-correlation matrix between the transformation matrix of the current frame and the previous frame, as follows:

$$\delta_t=\|I_n-\mathrm{corr}(V_t,V_{t-1})$$

where $I_n$ is the identity matrix, $V_t$ the eigenvectors of the frame of index t, and $\|M\|$ is a norm of matrix M which corresponds here to the sum of the absolute values of all the coefficients. Other matrix norms can be used (for example the Frobenius norm).

If the two matrices are identical then this difference is equal to 0. The more the matrices are dissimilar, the greater the value of the difference $\delta_t$. Predetermined thresholds can be applied to $\delta_t$, each threshold being associated with a predefined number of interpolations, for example according to the following decision logic:

Thresholds: {4.0, 5.0, 6.0, 7.0}

Number K of subframes for interpolation: {10, 48, 96, 192}

Thus only two bits can be sufficient to encode the four possible values giving the number of subdivisions (subframes).

The number K of interpolations determined by block 450 is then sent to the interpolation module 460, and in the adaptive case the number of subframes is encoded in the form of a binary index which is sent to the multiplexer (block 350).

The implementation of interpolation enables ultimately applying an optimization of the decorrelation of the input channels before multi-mono encoding. Indeed, the rotation matrices respectively calculated for a previous frame t−1 and a current frame t can be very different due to this search for decorrelation, but even so, interpolation makes it possible to smooth this difference. The interpolation used only requires a limited computing cost for the encoder and decoder since it is performed in a specific domain (angle in 2D, quaternion in 3D, quaternion pair in 4D). This approach is more advantageous than interpolating covariance matrices calculated for the PCA/KLT analysis and repeating an EVD type of eigenvalue decomposition several times per frame.

Block 470 then performs matrixing of the ambisonic channels per subframe, using the transformation matrices calculated in block 460. This matrixing amounts to calculating $V_t^{interp}(\alpha)^T X(\alpha)$ per subframe, where $X(\alpha)$) corresponds to sub-blocks of size n×(L/K) for α=1/K, 2/K, . . . 1. The signal contained in these channels is then sent to block 340 for multi-mono encoding.

Figure 5:
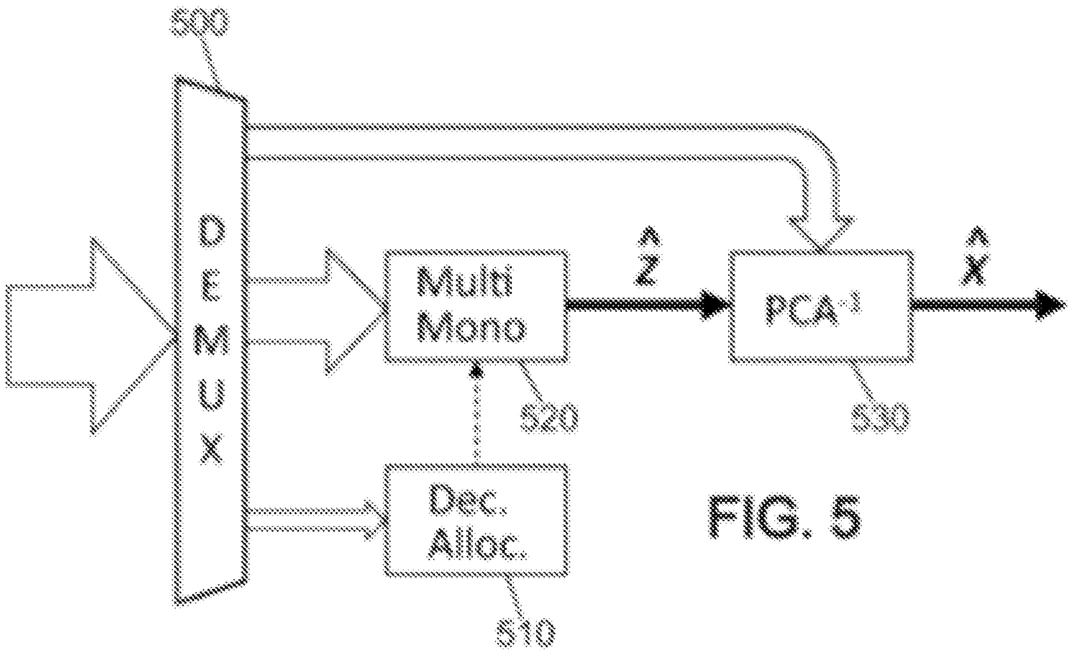
FIG. 5 shows an example of a decoder according to the invention.

Reference is now made to FIG. 5, to describe a decoder in an exemplary embodiment of the invention.

After the demultiplexing of the bit stream for the current frame t by block 500, the allocation information is decoded (block 510) which makes it possible to demultiplex and decode (block 520) the bit stream(s) received for each of the n transformed channels.

Block 520 calls multiple instances of the core decoding, executed separately. The core decoding can be of the EVS type, optionally modified to improve its performance. Using a multi-mono approach, each channel is decoded separately. If the encoding previously used is stereo or multichannel encoding, the multi-mono approach can be replaced with multi-stereo or multi-channel for decoding. The channels thus decoded are sent to block 530 which decodes the rotation matrix for the current frame and optionally the number K of subframes to be used for interpolation (if the interpolation is adaptive). For each matrix, the interpolation block 460 divides the frame into subframes, for which the number K can be read in the stream encoded by block 610 (FIG. 6) and interpolates the rotation matrices, the aim being to find—in the absence of transmission errors—the same matrices as in block 460 of the encoder in order to be able to reverse the transformation done previously in block 470.

Figure 6:
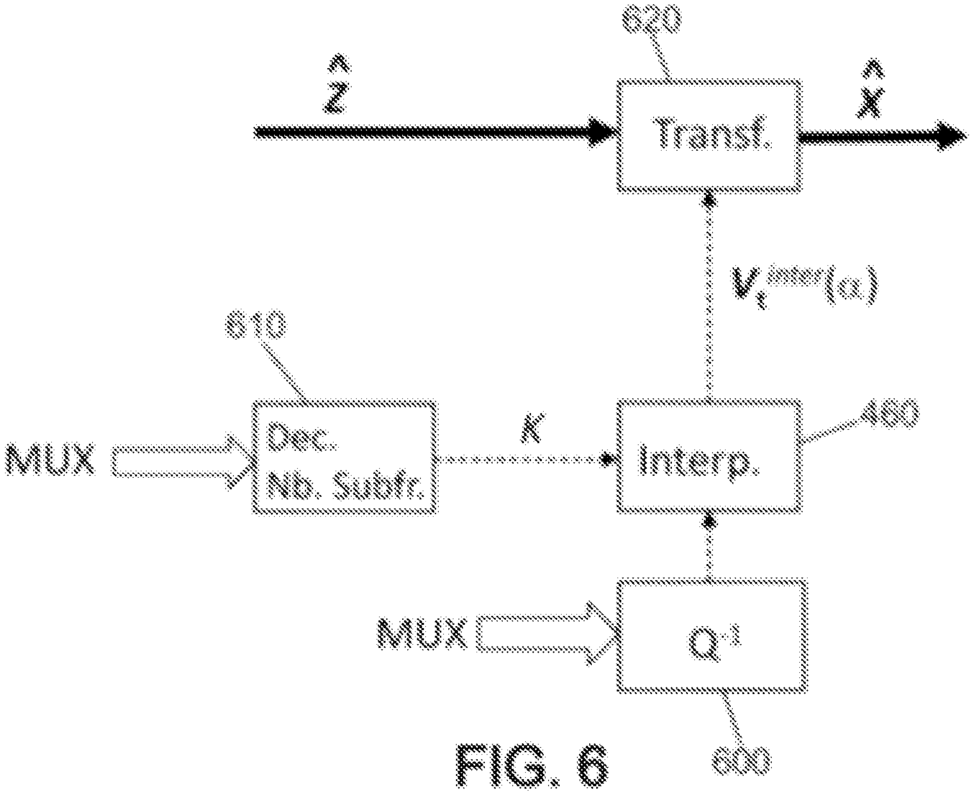
FIG. 6 shows the decoding and the PCA/KLT synthesis that is the reverse of FIG. 4, in decoding.

Block 530 performs the matrixing to reverse that of block 470 in order to reconstruct a decoded signal, as detailed below with reference to FIG. 6. This matrixing amounts to calculating $V_t^{interp}(\alpha)\hat{X}(\alpha)$ per subframe, where $\hat{X}(\alpha)$ corresponds to the successive sub-blocks of size n x (L/K) for α=1/K, 2/K, . . . 1.

Block 530 in general performs the decoding and the reverse PCA/KLT synthesis to what was performed by block 310 of FIG. 3. The quantization indices of the rotation quantization parameters in the current frame are decoded in block 600. Scalar quantization can be used and the quantization step size is the same for each angle. In the adaptive case, the number of interpolation subframes is decoded (block 610) to find the number K of subframes among the set {10, 48, 96, 192}; in some variants where the frame length L is different, this set of values may be adapted. The interpolation of the decoder is the same as that performed in the encoder (block 460).

Block 620 performs the inverse matrixing of the ambisonic channels per subframe, using the inverses (in practice the transposes) of the transformation matrices calculated in block 460.

Thus, the invention uses an entirely different approach than the MPEG-H codec with overlap-add based on a specific representation of transformation matrices which are restricted to rotation matrices from one frame to another, in the time domain, enabling in particular an interpolation of the transformation matrices, with a mapping which ensures directional consistency (including taking into account the direction by the sign).

The general approach of the invention is an encoding of ambisonic sounds in the time domain by PCA, in particular with PCA transformation matrices forced to be rotation matrices and interpolated by subframes in an optimized manner (in particular in the domain of quaternions/pairs of quaternions) in order to improve quality. The interpolation step size is either fixed or adaptive depending on a criterion of the difference between an inter-correlation matrix and a reference matrix (identity) or between matrices to be interpolated. The quantization of rotation matrices can be implemented in the domain of generalized Euler angles. However, preferably it may be chosen to quantify matrices of dimension 3 and 4 in the domain of quaternions and quaternion pairs (respectively), which makes it possible to remain in the same domain for quantization and interpolation.

In addition, an alignment of eigenvectors is used to avoid the problems of clicks and channel inversion from one frame to another.

Of course, the invention is not limited to the embodiments described above as examples, and extends to other variants.

The above description thus discussed cases of four channels.

However, in some variants, it is also possible to encode a number of channels greater than four.

The implementation remains identical (in terms of functional blocks) to the case of n=4, but the interpolation by quaternion pair is replaced by the general method below.

The transformation matrices at frames t−1 and t are denoted $V_{t-1}$ and $V_t$. The interpolation can be performed with a factor α between $V_{t-1}$ and $V_t$ such that:

$$V_t^{interp}(\alpha)=V_{t-1}(V_{t-1}^T V_t)^\alpha$$

The term $(V_{t-1}^T V_t)^\alpha$ can be calculated directly by eigenvalue decomposition of $V_{t-1}^T V_t$. Indeed, if $V_{t-1}^T V_t=QLQ^T$, we have: $(V_{t-1}^T V_t)^\alpha=QL^\alpha Q^T$.

Also note that this variant could also replace the interpolation by pair of unit quaternions (4D case), unit quaternion (3D case), or angle, however this would be less advantageous because it would require an additional diagonalization step and power calculations, while the embodiment described above is more efficient for these cases of 2, 3, or 4 channels.

Although the present disclosure has been described with reference to one or more examples, workers skilled in the art will recognize that changes may be made in form and detail without departing from the scope of the disclosure and/or the appended claims.

The invention claimed is:

1. A method of encoding for compression of audio signals forming, over time, a succession of sample frames, in each of N channels in an ambisonic representation of order higher than 0, the method being implemented by an encoding device and comprising:

forming, based on the channels and for a current frame, a matrix of inter-channel covariance, and searching for eigenvectors of said covariance matrix with a view to obtaining a matrix of eigenvectors, testing the matrix of eigenvectors to verify that the matrix represents a rotation in an N-dimensional space, and if not, correcting the matrix of eigenvectors until a rotation matrix is obtained, for the current frame, and applying said rotation matrix to the signals of the N channels before encoding of said signals.

2. The method according to claim 1, further comprising:

comparing the matrix of eigenvectors that is obtained for the current frame, to a rotation matrix obtained for a frame preceding the current frame, and permuting columns of the matrix of eigenvectors of the current frame to ensure consistency with the rotation matrix of the previous frame.

3. The method according to claim 2, wherein said permutation of the columns makes it possible to ensure consistency of the axes of the vectors, and the method further comprises:

verifying, for each eigenvector of the current frame, a directional consistency with a column vector of corresponding position in the rotation matrix of the previous frame, and in the event of inconsistency, inverting a sign of the elements of this eigenvector in the matrix of eigenvectors of the current frame.

4. The method according to claim 1, further comprising:

estimating a difference between the rotation matrix obtained for the current frame and a rotation matrix obtained for a frame preceding the current frame, based on the estimated difference, determining whether at least one interpolation is to be performed between the rotation matrix of the current frame and the rotation matrix of the previous frame.

5. The method according to claim 4, wherein:

based on the estimated difference, determining a number of interpolations to be performed between the rotation matrix of the current frame and the rotation matrix of the previous frame, dividing the current frame into a number of subframes corresponding to the number of interpolations to be performed, and encoding at least this number of interpolations with a view to transmission via a network.

6. The method according to claim 1, wherein, with a permutation between columns of the matrix of eigenvectors to invert the sign of a determinant of the matrix of eigenvectors and a determinant of a rotation matrix being equal to 1, if the determinant of the matrix of eigenvectors is equal to −1, the signs of the elements of a chosen column of the matrix of eigenvectors are inverted so that the determinant is equal to 1 and thus a rotation matrix is formed.

7. The method according to claim 1, wherein the ambisonic representation is first-order and the number N of channels is four, and wherein the rotation matrix of the current frame is represented by two quaternions.

8. The method according to claim 6, wherein the ambisonic representation is first-order and the number N of channels is four, and wherein the rotation matrix of the current frame is represented by two quaternions, and wherein each interpolation for a current subframe is a spherical linear interpolation, carried out as a function of the interpolation of the subframe preceding the current subframe and based on the quaternions of the previous subframe.

9. The method according to claim 8, wherein the spherical linear interpolation of the current subframe is carried out to obtain the quaternions of the current subframe, as follows:

$$Q_{L,interp}(\alpha) = Q_{L,t-1}\frac{\sin(1-\alpha)\Omega_L}{\sin\Omega_L} + Q_{L,t}\frac{\sin\alpha\Omega_L}{\sin\Omega_L}$$

$$Q_{R,interp}(\alpha) = Q_{R,t-1}\frac{\sin(1-\alpha)\Omega_R}{\sin\Omega_R} + Q_{R,t}\frac{\sin\alpha\Omega_R}{\sin\Omega_R}$$

where:

$Q_{L,t-1}$ is one of the quaternions of the previous subframe t−1, $Q_{R,t-1}$ is the other quaternion of the previous subframe t−1, $Q_{L,t}$ is one of the quaternions of the current subframe t, $Q_{R,t}$ is the other quaternion of the current subframe t, $\Omega_L$=Arccos $(Q_{L,t-1}\cdot Q_{L,t})$; $\Omega_R$=Arccos $(Q_{R,t-1}\cdot Q_{R,t})$ and α corresponds to an interpolation factor.

10. The method according to claim 1, wherein the search for eigenvectors is carried out by principal component analysis or by Karhunen-Loeve transform, in the time domain.

11. The method according to claim 1, wherein the method further comprises a prior step of predicting a bit allocation budget per ambisonic channel, which comprises:

for each ambisonic channel, estimating a current acoustic energy in the channel, selecting, in a memory, a predetermined quality score, based on this ambisonic channel and on a current bitrate in the network, estimating a weighting to be applied for the bit allocation to this channel, by multiplying the selected score by the estimated energy.

12. The method according to claim 1, further comprising quantizing the rotation matrix, said rotation matrix applied to the signals of the N channels being in a quantized representation.

13. The method according to claim 1, further comprising quantizing the rotation matrix to produce a quantized matrix and interpolating the quantized matrix, said rotation matrix applied to the signals of the N channels being in a quantized and interpolated representation.

14. The method according to claim 13, wherein the interpolating is carried out in the domain of quaternions.

15. A method or decoding audio signals forming, over time, a succession of sample frames, in each of N channels in an ambisonic representation of order higher than 0, the method being implemented by a decoding device and comprising:

receiving, for a current frame, in addition to the signals of the N channels of this current frame, parameters of a rotation matrix;

constructing an inverse rotation matrix from said parameters; and applying said inverse rotation matrix to signals from the N channels received, before decoding of said signals.

16. An encoding device comprising:

a processing circuit configured to compress of audio signals forming, over time, a succession of sample frames, in each of N channels in an ambisonic representation of order higher than 0, by:

forming, based on the channels and for a current frame, a matrix of inter-channel covariance, and searching for eigenvectors of said covariance matrix with a view to obtaining a matrix of eigenvectors, testing the matrix of eigenvectors to verify that the matrix represents a rotation in an N-dimensional space, and if not, correcting the matrix of eigenvectors until a rotation matrix is obtained, for the current frame, and applying said rotation matrix to the signals of the N channels before encoding of said signals.

17. A decoding device comprising:

a processing circuit configured to decode audio signals forming, over time, a succession of sample frames, in each of N channels in an ambisonic representation of order higher than 0, by:

receiving, for a current frame, in addition to the signals of the N channels of this current frame, parameters of a rotation matrix;

constructing an inverse rotation matrix from said parameters; and applying said inverse rotation matrix to signals from the N channels received, before decoding of said signals.

18. A non-transitory computer-readable medium comprising a computer program stored thereon comprising instructions for implementing a method of encoding for compression of audio signals, when said instructions are executed by a processor of a processing circuit, the audio signals forming, over time, a succession of sample frames, in each of N channels in an ambisonic representation of order higher than 0, wherein the instructions configure the processing circuit to:

form, based on the channels and for a current frame, a matrix of inter-channel covariance, and searching for eigenvectors of said covariance matrix with a view to obtaining a matrix of eigenvectors, test the matrix of eigenvectors to verify that the matrix represents a rotation in an N-dimensional space, and if not, correcting the matrix of eigenvectors until a rotation matrix is obtained, for the current frame, and apply said rotation matrix to the signals of the N channels before encoding of said signals.

* * * * *